(12) United States Patent
Oechsle et al.

(10) Patent No.: US 12,065,965 B1
(45) Date of Patent: Aug. 20, 2024

(54) ROTATING DETONATION AUGMENTORS WITH ADJUSTABLE THROATS FOR GAS TURBINE ENGINES

(71) Applicants: Rolls-Royce North American Technologies Inc., Indianapolis, IN (US); Rolls-Royce Corporation, Indianapolis, IN (US)

(72) Inventors: Victor L. Oechsle, Indianapolis, IN (US); Kenneth M. Pesyna, Indianapolis, IN (US); Bryan H. Lerg, Indianapolis, IN (US); Michael C. Monzella, Indianapolis, IN (US); Zachary A. Rauch, Indianapolis, IN (US); Michael Moser, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/234,340

(22) Filed: Aug. 15, 2023

(51) Int. Cl.
| | |
|---|---|
| *F02K 3/11* | (2006.01) |
| *F02C 5/00* | (2006.01) |
| *F02K 3/02* | (2006.01) |
| *F02K 3/075* | (2006.01) |
| *F23R 7/00* | (2006.01) |

(52) U.S. Cl.
CPC ............... *F02C 5/00* (2013.01); *F02K 3/025* (2013.01); *F02K 3/075* (2013.01); *F02K 3/11* (2013.01); *F23R 7/00* (2013.01)

(58) Field of Classification Search
CPC ... F02K 3/02; F02K 3/025; F02K 3/04; F02K 3/06; F02K 3/075; F02K 3/08; F02K 3/10; F02K 3/105; F02K 3/11; F02C 5/00; F23R 7/00
See application file for complete search history.

(56) References Cited

U.S. PATENT DOCUMENTS

| | | | |
|---|---|---|---|
| 3,999,378 A | 12/1976 | Tatum, Jr. et al. | |
| 5,311,735 A * | 5/1994 | Orlando | F02K 7/16 60/225 |
| 5,806,303 A * | 9/1998 | Johnson | F02K 3/105 60/226.3 |
| 6,442,930 B1 | 9/2002 | Johnson et al. | |
| 7,096,674 B2 | 8/2006 | Orlando et al. | |
| 7,140,174 B2 | 11/2006 | Johnson | |
| 7,837,436 B2 | 11/2010 | Corsmeier et al. | |
| 8,726,670 B2 | 5/2014 | Bachman et al. | |
| 8,961,114 B2 | 2/2015 | Ruthemeyer | |
| 9,506,423 B2 | 11/2016 | Izquierdo et al. | |
| 10,087,884 B2 | 10/2018 | Peters et al. | |
| 10,371,090 B2 | 8/2019 | Lovett et al. | |
| 11,041,463 B1 | 6/2021 | Weiss | |

(Continued)

*Primary Examiner* — William H Rodriguez
(74) *Attorney, Agent, or Firm* — Barnes & Thornburg LLP

(57) ABSTRACT

A gas turbine engine includes a bypass duct and a rotating detonation augmentor. The bypass duct is configured to conduct air through a flow path arranged around an engine core of the gas turbine engine to provide thrust for propelling the gas turbine engine. The rotating detonation augmentor is located in the bypass duct and configured to be selectively operated to detonate fuel and a portion of the air to increase the thrust for propelling the gas turbine engine.

20 Claims, 11 Drawing Sheets

(56) References Cited

U.S. PATENT DOCUMENTS

| | | |
|---|---|---|
| 11,261,827 B2 | 3/2022 | Roberge |
| 11,408,610 B1 | 8/2022 | Rich et al. |
| 2002/0166318 A1* | 11/2002 | Baker ..................... F02K 3/115 60/263 |
| 2003/0126853 A1* | 7/2003 | Koshoffer ................. F02K 7/02 60/204 |
| 2005/0120700 A1* | 6/2005 | Tangirala .................. F02K 3/08 60/39.76 |
| 2013/0305686 A1 | 11/2013 | Conrardy et al. |
| 2014/0263712 A1* | 9/2014 | Froemming .............. F02K 1/30 239/265.17 |
| 2022/0389883 A1* | 12/2022 | Burd ........................ F02K 3/02 |
| 2022/0389884 A1* | 12/2022 | Burd ........................ F02K 7/10 |
| 2023/0323809 A1* | 10/2023 | Cross ....................... F02C 7/18 60/768 |

\* cited by examiner

ROTATING DETONATION AUGMENTORS WITH ADJUSTABLE THROATS FOR GAS TURBINE ENGINES

FIELD OF THE DISCLOSURE

The present disclosure relates generally to gas turbine engines, and more specifically to augmentors adapted for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

The output shaft may be coupled to a fan that urges air around the engine to provide thrust for propelling an aircraft, for example. Providing augmented thrust to gas turbine engines remains an area of interest. Some existing systems have various shortcomings relative to certain applications. Accordingly, there remains a need for further contributions in this area of technology.

SUMMARY

The present disclosure may comprise one or more of the following features and combinations thereof.

A gas turbine engine may comprise a bypass duct and a rotating detonation augmentor. The bypass duct may be configured to conduct air through a flow path arranged around an engine core of the gas turbine engine to provide thrust for propelling the gas turbine engine. The bypass duct may have an outer wall arranged circumferentially about an axis to define an outer boundary of the flow path and an inner wall arranged circumferentially about the axis to define an inner boundary of the flow path. The rotating detonation augmentor may be located in the bypass duct. The rotating detonation augmentor may be configured to be selectively operated to detonate fuel and a portion of the air to increase the thrust for propelling the gas turbine engine.

In some embodiments, the rotating detonation augmentor may include an inner augmentor band, an outer augmentor band, and flow restriction means. The inner augmentor band may extend circumferentially about the axis. The outer augmentor band may extend circumferentially around the inner augmentor band. The flow restriction means may be for selectively producing a throat and for selectively removing the throat. The throat may be located radially between the inner augmentor band and the outer augmentor band. The throat may contract a flow area of the portion of the air flowing through the rotating detonation augmentor and may block detonated gases from flowing upstream through the throat when the rotating detonation augmentor is being operated. The throat may be removed to allow the portion of the air to flow freely between the inner augmentor band and the outer augmentor band to minimize pressure losses in the bypass duct when the rotating detonation augmentor is not being operated.

In some embodiments, the flow restriction means may include a throat-control band located radially between the outer augmentor band and the inner augmentor band. The throat-control band may have a ring segment and a throat body. The ring segment may extend circumferentially relative to the axis. The throat body may extend radially away from the ring segment. The throat-control band may be configured to move axially between a first position and a second position. The first position may be in which the throat body is aligned axially with the outer augmentor band and the inner augmentor band to produce the throat. The second position may be in which the throat body is axially misaligned with the outer augmentor band and the inner augmentor band so that the portion of air is not restricted in the rotating detonation augmentor.

In some embodiments, the throat body may include a first protrusion and a second protrusion. The first protrusion may extend radially outward away from the ring segment toward the outer augmentor band. The second protrusion may extend radially inward from the ring segment toward the inner augmentor band.

In some embodiments, the flow restriction means may include a source of high pressure air that directs selectively pressurized air. The selectively pressurized air may have a pressure greater than a pressure of the air flowing through the bypass duct. The selectively pressurized air may be directed into a space radially between the outer augmentor band and the inner augmentor band to provide the throat.

In some embodiments, the flow restriction means may further include first passages and second passages. The first passages may be formed in the outer augmentor band that are in fluid communication with the source of high pressure air and open into the space. The second passages may be formed in the inner augmentor band that are in fluid communication with the source of high pressure air and open into the space.

In some embodiments, the flow restriction means may include an outer flap and an inner flap. The outer flap may be coupled with the outer augmentor band. The inner flap may be coupled with the inner augmentor band. The outer flap and the inner flap may be configured to move between a first arrangement and a second arrangement. The first arrangement may be in which the outer flap and the inner flap converge radially toward one another as the outer flap and the inner flap extend axially aft to provide the throat. The second arrangement may be in which the outer flap and the inner flap are moved radially outward away from the first arrangement so that the portion of air is not restricted in the rotating detonation augmentor.

In some embodiments, the outer flap may be formed to include outer fuel passages that extend through the outer flap and open into a space defined radially between the outer augmentor band and the inner augmentor band. The outer fuel passages may direct selectively a first fuel flow into the space. The inner flap may be formed to include inner fuel passages that extend through the inner flap and open into the space to direct selectively a second fuel flow into the space.

In some embodiments, in the second arrangement, a radial inner surface of the outer flap may be generally flush with a radial inner surface of the outer augmentor band and a radial outer surface of the inner flap may be generally flush with a radial outer surface of the inner augmentor band. The rotating detonation augmentor may further include a strut and an ejector ring. The strut may extend from one of the outer wall and the inner wall radially into the flow path. The strut may be coupled with the outer augmentor band and the inner augmentor band. The ejector ring may extend circumferentially about the axis. The ejector ring may be coupled with the strut. The ejector ring may be configured to direct pressurized air into the rotating detonation augmentor.

According to another aspect of the present disclosure, a gas turbine engine may comprise a bypass duct and a rotating detonation augmentor. The bypass duct may have an outer wall arranged circumferentially about an axis to define an outer boundary of a flow path and an inner wall arranged circumferentially about the axis to define an inner boundary of the flow path. The rotating detonation augmentor may be located in the bypass duct.

In some embodiments, the rotating detonation augmentor may include a first augmentor band, a second augmentor band, and a flow restrictor. The first augmentor band may extend circumferentially about the axis. The second augmentor band may extend circumferentially about the axis and may be aligned axially with the first augmentor band. The flow restrictor may be configured to selectively produce a throat radially between the first augmentor band and the second augmentor band. The throat may block gases from flowing upstream through the throat when the rotating detonation augmentor is being operated.

In some embodiments, the first augmentor band may be integrally formed with one of the outer wall and the inner wall of the bypass duct. The flow restrictor may include a throat-control band located radially between the first augmentor band and the second augmentor band. The throat-control band may have a ring segment and a throat body. The ring segment may extend circumferentially relative to the axis. The throat body may extend radially away from the ring segment. The throat-control band may be configured to move axially between a first position and a second position. The first position may be in which the throat body is aligned axially with the first augmentor band and the second augmentor band to produce the throat. The second position may be in which the throat body is at least partway misaligned axially with the first augmentor band and the second augmentor band.

In some embodiments, the flow restrictor may include a source of high pressure air that directs selectively pressurized air into a space radially between the first augmentor band and the second augmentor band to provide the throat. The selectively pressurized air may have a pressure greater than a pressure of air flowing through the bypass duct.

In some embodiments, the flow restrictor may further include first passages and second passages. The first passages may be formed in the first augmentor band that are in fluid communication with the source of high pressure air and open into the space. The second passages may be formed in the second augmentor band that are in fluid communication with the source of high pressure air and open into the space.

In some embodiments, the flow restrictor includes a first flap and a second flap. The first flap may be coupled with the first augmentor band. The second flap may be coupled with the second augmentor band. The first flap may be configured to pivot relative to the first augmentor band. The second flap may be configured to pivot relative to the second augmentor band.

In some embodiments, the first flap may be formed to include first fuel passages that extend through the first flap and open into a space defined radially between the first augmentor band and the second augmentor band. The first fuel passages may direct selectively a first fuel flow into the space. The second flap may be formed to include second fuel passages that extend through the second flap and open into the space. The second fuel passages may direct selectively a second fuel flow into the space.

A method may comprise directing a flow of air between a first wall and a second wall of a bypass duct that is arranged along an axis. The method may comprise restricting a flow area of a portion of the flow of the air passing between a first augmentor band and a second augmentor band of a rotating detonation augmentor located within the bypass duct. The method may comprise detonating fuel and the portion of the flow of the air with the rotating detonation augmentor. The method may comprise unrestricting the flow area of the portion of the flow of the air passing between the first augmentor band and the second augmentor band of the rotating detonation augmentor to minimize pressure loss of the portion of the flow of the air.

In some embodiments, restricting the flow area of the portion of the flow of the air may include aligning axially a throat body of a throat-control band with the first augmentor band and the second augmentor band. Unrestricting the flow area of the portion of the flow of the air may include moving the throat body of the throat-control band axially relative to the axis to cause the throat body to be at least partially axially misaligned with the first augmentor band and the second augmentor band.

In some embodiments, restricting the flow area of the portion of the flow of the air may include directing a flow of pressurized air radially between the first augmentor band and the second augmenter band. The flow of the pressurized air may have a pressure that is greater than a pressure of the portion of the flow of the air. Unrestricting the flow area of the portion of the flow of the air may include stopping the flow of the pressurized air radially between the first augmentor band and the second augmenter band.

In some embodiments, restricting the flow area of the portion of the flow of the air may include moving a first flap coupled with the first augmentor band and a second flap coupled with the second augmentor band to cause a first portion of the first flap to be spaced apart from a second portion of the second flap by a first radial distance. Unrestricting the flow area of the portion of the flow of the air may include moving the first flap and the second flap such that the first portion of the first flap is spaced apart from the second portion of the second flap by a second radial distance that is greater than the first radial distance.

These and other features of the present disclosure will become more apparent from the following description of the illustrative embodiments.

DETAILED DESCRIPTION OF THE DRAWINGS

Figure 1:
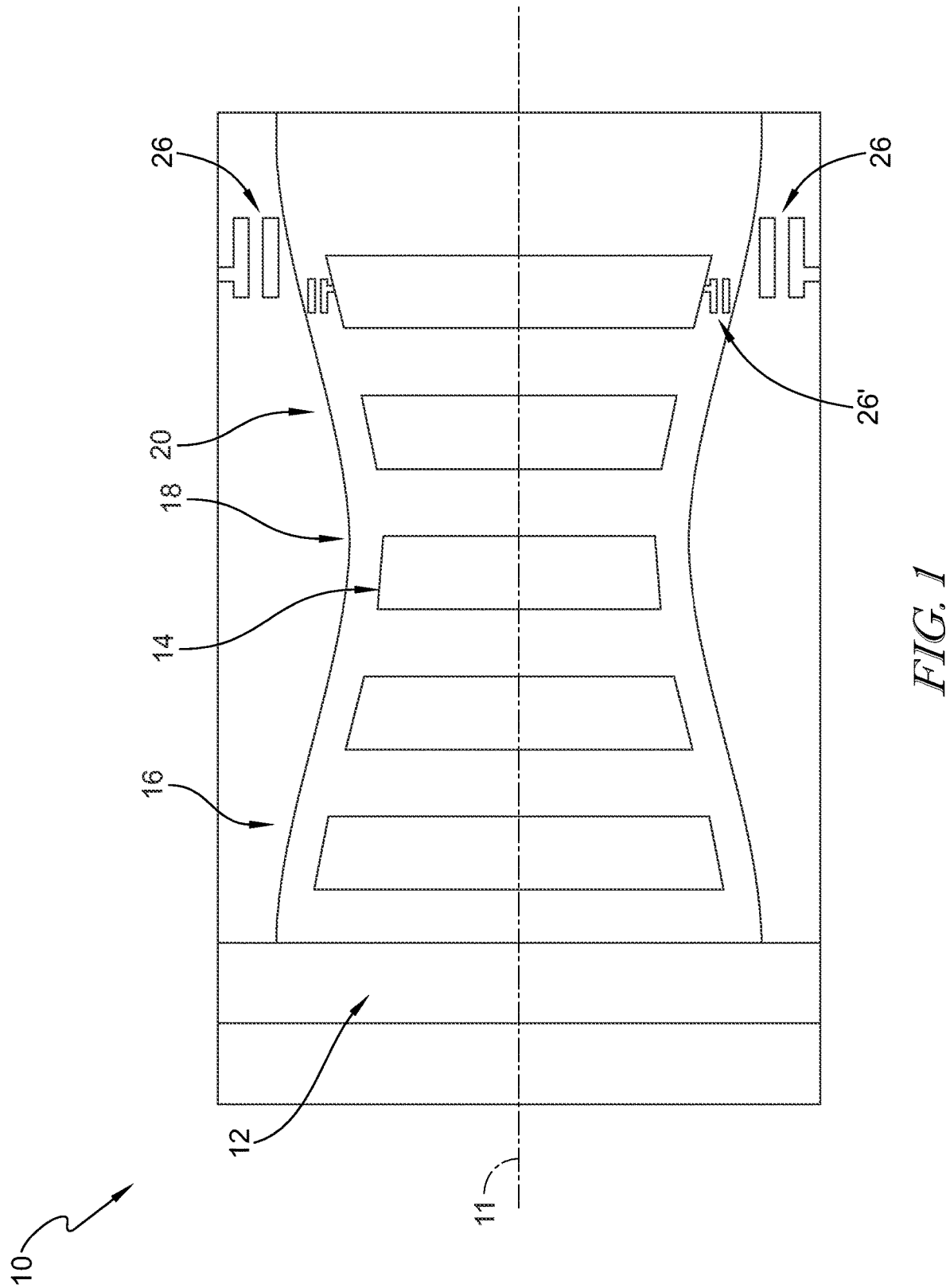
FIG. 1 is perspective view of a gas turbine engine having an engine core having a compressor, a combustor, and a turbine, a fan coupled with the turbine and configured to provide thrust to propel an aircraft, a bypass duct encasing the fan and the engine core, and a rotating detonation augmentor located in the bypass duct and configured to detonate fuel and a portion of the bypass air to increase the thrust generated by the gas turbine engine.

For the purposes of promoting an understanding of the principles of the disclosure, reference will now be made to a number of illustrative embodiments illustrated in the drawings and specific language will be used to describe the same.

An illustrative gas turbine engine 10 includes a fan 12 and an engine core 14 as shown in FIG. 1. The engine core 14 includes a compressor 16, a combustor 18 located downstream of the compressor 16, and a turbine 20 located downstream of the combustor 18. The fan 12 is driven by and coupled to the turbine 20. As suggested in FIGS. 1 and 2, the fan 12 rotates about a central axis 11 to force air 15 through a flow path 22 arranged around the engine core 14 so that the air 15 is directed through a bypass duct 24 to provide thrust to propel the gas turbine engine 10. The compressor 16 compresses and delivers air to the combustor 18. The combustor 18 mixes fuel with the compressed air received from the compressor 16 and ignites the fuel. The hot, high-pressure products of the combustion reaction in the combustor 18 are directed into the turbine 20 to cause the turbine 20 to rotate about the central axis 11 and drive the compressor 16 and the fan 12.

Figure 2:
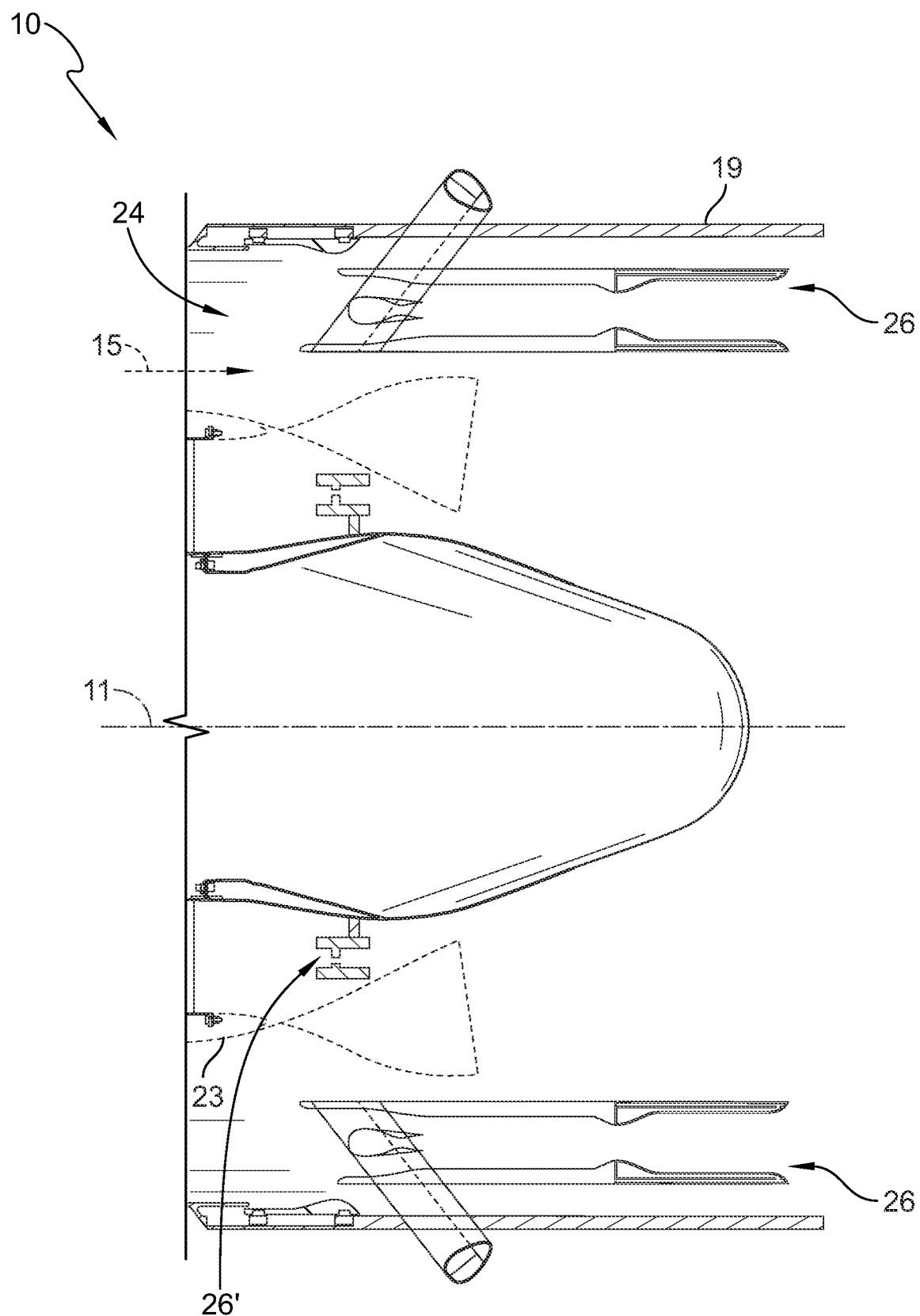
FIG. 2 is a section view of the bypass duct and the rotating detonation augmentor located in the bypass duct downstream of the turbine, the rotating detonation augmentor having an outer augmentor band and an inner augmentor band that define a throat for restricting a flow area of the portion of the bypass air flowing through the rotating detonation augmentor.

The bypass duct 24 is arranged circumferentially around the engine core 14 as shown in FIG. 2. The bypass duct 24 includes an outer wall 19 and an inner wall 23. The outer wall 19 is arranged circumferentially about the axis 11 to define an outer boundary of the flow path 22. The inner wall 23 is arranged circumferentially about the axis 11 to define an inner boundary of the flow path 22. Some of the air 15 flows through the bypass duct 24 around the engine core 14 (i.e., bypass air), while some of the air 15 flows through the engine core 14 (i.e., core air). The bypass air and the core air is mixed downstream of the turbine 20 at an exhaust of the gas turbine engine 10.

Figure 3:
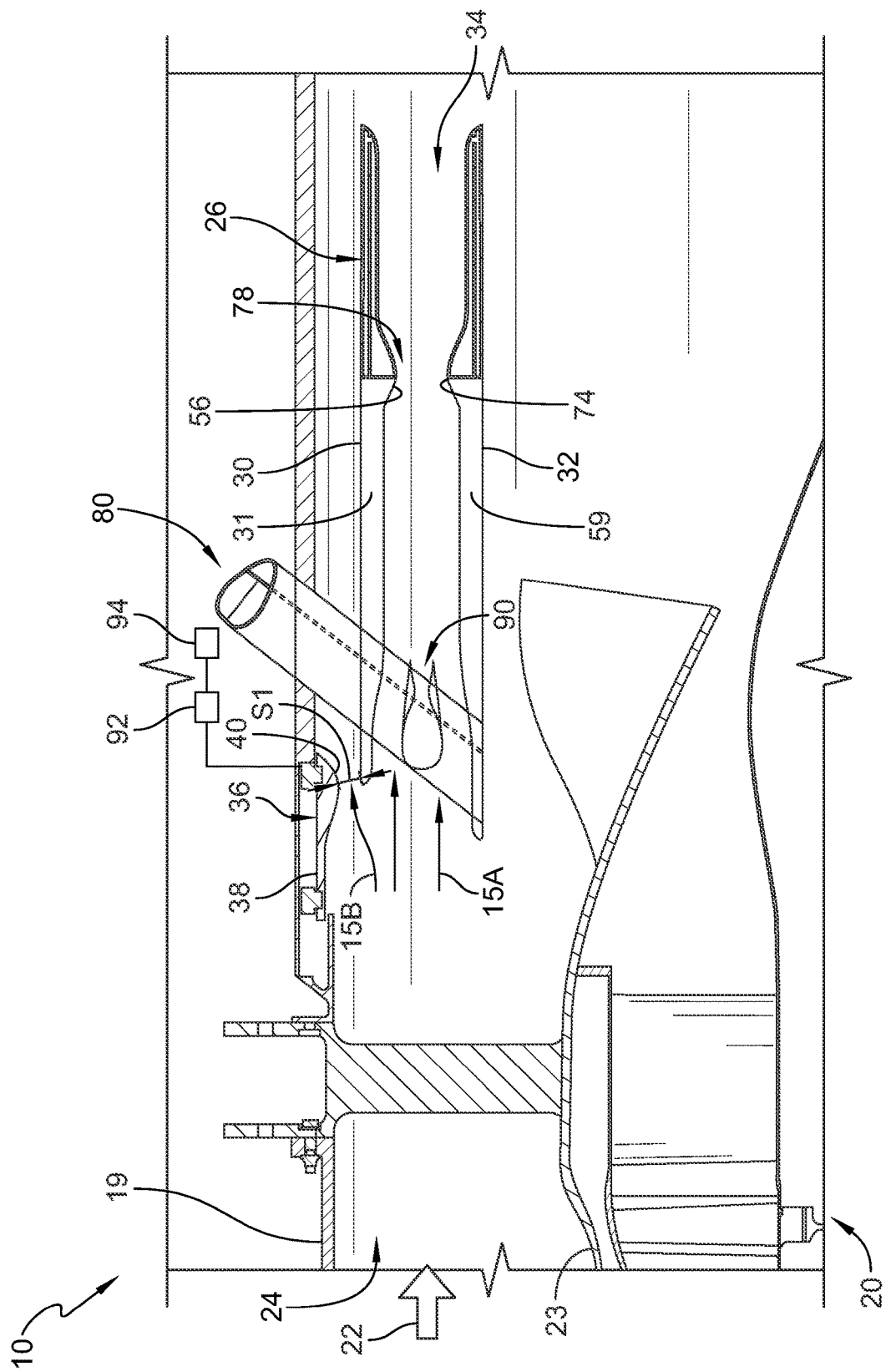
FIG. 3 is an enlarged section view of the gas turbine engine of FIG. 2 showing a portion of the turbine, the rotating detonation augmentor, and a flow valve in a first position wherein a space between the flow valve and the rotating detonation augmentor is relatively closed and small to cause less bypass air to flow around the augmentor and to increase the amount of bypass air flowing into the rotating detonation augmentor while the rotating detonation augmentor is being operated.

The gas turbine engine 10 further includes a rotating detonation augmentor 26 located in the bypass duct 24 axially aft of the turbine 20 as shown in FIGS. 2 and 3. A first portion 15A of the bypass air flows through the rotating detonation augmentor 26 and a second portion 15B of the bypass air bypasses and flows around the rotating detonation augmentor 26. The rotating detonation augmentor 26 is configured to be selectively operated to detonate fuel 28 and the first portion 15A of the bypass air to increase thrust generated by the gas turbine engine 10. When additional thrust is desired of the gas turbine engine 10, the first portion 15A of the bypass air is mixed with the fuel 28 and detonated to provide additional thrust for an aircraft including the gas turbine engine 10.

Figure 4:
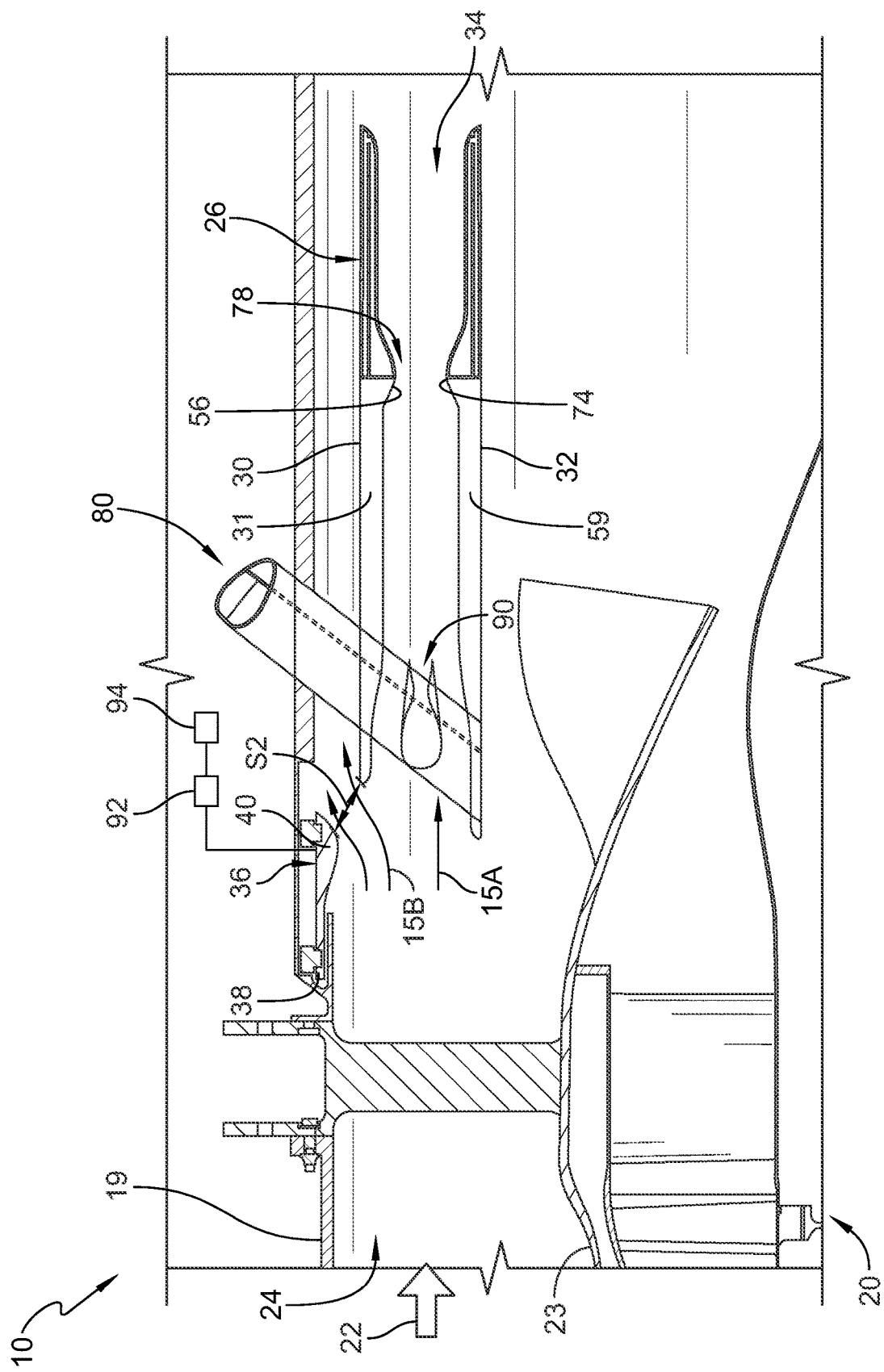
FIG. 4 is an enlarged section view similar to FIG. 3 showing the flow valve in a second position wherein a space between the flow valve and the rotating detonation augmentor is opened and larger to allow more bypass air to flow around the augmentor and minimize pressure losses in the bypass duct while the rotating detonation augmentor is not being operated.

The rotating detonation augmentor 26 includes an outer augmentor band 30 and an inner augmentor band 32 axially aligned with the outer augmentor band 30 as shown in FIGS. 2-4. The inner augmentor band 32 and the outer augmentor band 30 are both annular, and the outer augmentor band 30 is located radially outward of the inner augmentor band 32. The outer augmentor band 30 and the inner augmentor band 32 are radially spaced apart from one another to define a radial space 34 therebetween. The outer augmentor band 30 and the inner augmentor band 32 may be formed of metallic materials, ceramic matrix composite materials, or any other suitable materials.

In the illustrative embodiment, the rotating detonation augmentor includes two bands, the outer augmentor band 30 and the inner augmentor band 32. In some embodiments, one of the outer augmentor band 30 and the inner augmentor band 32 is integrally formed with the outer wall 19 or the inner wall 23, respectively as suggested in FIG. 5. In some embodiments, the rotating detonation augmentor includes additional axially aligned and radially spaced bands that provide additional rotating detonation chambers as suggested in FIGS. 10-12. The teachings of the different embodiments of the present disclosure may be used in the other embodiments. For example, the flow valves 36, 236 may be used with rotating detonation augmentors having three or more augmentor bands (like in FIG. 10).

The gas turbine engine 10 further includes a flow valve 36 coupled with the outer wall 19 of the bypass duct 24 as shown in FIGS. 3 and 4. The flow valve 36 extends circumferentially about the axis 11. The flow valve 36 axially translates relative to the outer wall 19 and the rotating detonation augmentor 26 between a first position, as shown in FIG. 3, and a second position, as shown in FIG. 4. The flow valve 36 is located nearer to the rotating detonation augmentor 26 in the first position as compared to the second position.

The rotating detonation augmentor 26 is operated when additional thrust is desired. The flow valve 36 is in the first position, as shown in FIG. 3, in response to the rotating detonation augmentor 26 being operated. In the first position, more bypass air is forced through the rotating detonation augmentor 26 (i.e., the first portion 15A of the bypass air) instead of flowing around and bypassing the rotating detonation augmentor 26 because the flow valve 36 restricts the flow path of the second portion 15B of the bypass air. The flow valve 36 varies selectively an amount of the first portion 15A of the bypass air flowing into the rotating detonation augmentor 26. The larger the amount of the first portion 15A of the bypass air flowing into the rotating detonation augmentor 26, the potentially higher a magnitude of thrust provided by the rotating detonation augmentor 26 during operation of the rotating detonation augmentor 26.

The flow valve 36 is in the second position, as shown in FIG. 4, in response to the rotating detonation augmentor 26 not being operated. Because the rotating detonation augmentor 26 is not being operated, a high flow of bypass air does not need to be forced through the rotating detonation augmentor 26. In the second position, the flow valve 36 is farther from the rotating detonation augmentor 26 to allow more bypass air to flow around and bypass the rotating detonation augmentor 26 (i.e., the second portion 15B of the bypass air) instead of flowing through the rotating detonation augmentor 26. Because the flow path 22 is less obstructed when the flow valve 36 is in the second position, the second portion 15B of the bypass air is able to flow more freely around the rotating detonation augmentor 26, which minimizes pressure losses in the bypass duct 24 when the rotating detonation augmentor 26 is not being operated.

The flow valve 36 includes a ring segment 38 and a valve body 40 extending radially inward from the ring segment 38 into the flow path 22 of the bypass duct 24 as shown in FIGS. 3 and 4. The ring segment 38 is coupled with the outer wall 19 of the bypass duct 24 for movement relative to the outer wall 19. The valve body 40 protrudes into the flow path 22 toward the rotating detonation augmentor 26, and thus, helps to direct the first portion 15A of the bypass air through the rotating detonation augmentor 26 while the flow valve 36 is in the first position and the rotating detonation augmentor 26 is being operated.

In the first position of the flow valve 36, a first space S1 is formed between the valve body 40 and the outer augmentor band 30 as shown in FIG. 3. The first space S1 is relatively closed and small, which decreases the amount of the second portion 15B of the bypass air flowing around the rotating detonation augmentor 26 and increases the amount of the first portion 15A of the bypass air flowing into the rotating detonation augmentor 26. Because the first space S1 provides little area for the second portion 15B of the bypass air to flow between the valve body 40 and the outer augmentor band 30, the amount of the second portion 15B of the bypass air that flows radially between the valve body 40 and the outer augmentor band 30 is decreased. While the flow valve 36 is in the first position, the valve body 40 blocks a portion of the flow path 22 radially outward of the rotating detonation augmentor 26 so that more bypass air (i.e., the first portion 15A of the bypass air) is forced through the rotating detonation augmentor 26 while the rotating detonation augmentor 26 is operational.

In the second position of the flow valve 36, a second space S2 is formed between the valve body 40 and the outer augmentor band 30 as shown in FIG. 4. The second space S2 is larger than the first space S1. The second space S2 is relatively open and large to increase the amount of the second portion 15B of the bypass air flowing around the rotating detonation augmentor 26 while the rotating detonation augmentor 26 is not being operated. Because the flow path 22 radially outward of the rotating detonation augmentor 26 is relatively unobstructed, the amount of the second portion 15B of the bypass air that flows radially between the valve body 40 and the outer augmentor band 30 is increased. Thus, less bypass air (i.e., the first portion 15A of the bypass air) may be forced through the rotating detonation augmentor 26 because the second portion 15B of the bypass air can freely flow around the rotating detonation augmentor 26. The second portion 15B of the bypass air may cool the outer augmentor band 30, the outer wall 19 of the bypass duct 24, and/or components arranged downstream of the rotating detonation augmentor 26.

While the rotating detonation augmentor 26 is not being operated, it may be desirable to minimize the flow obstruction of the bypass air to decrease pressure losses within the bypass duct 24. To minimize flow obstruction and restriction, the flow valve 36 assumes the second position so that the second portion 15B of the bypass air may freely flow around the rotating detonation augmentor 26, thus decreasing potential pressure losses that may result from obstructions in the bypass duct 24.

Figure 8:
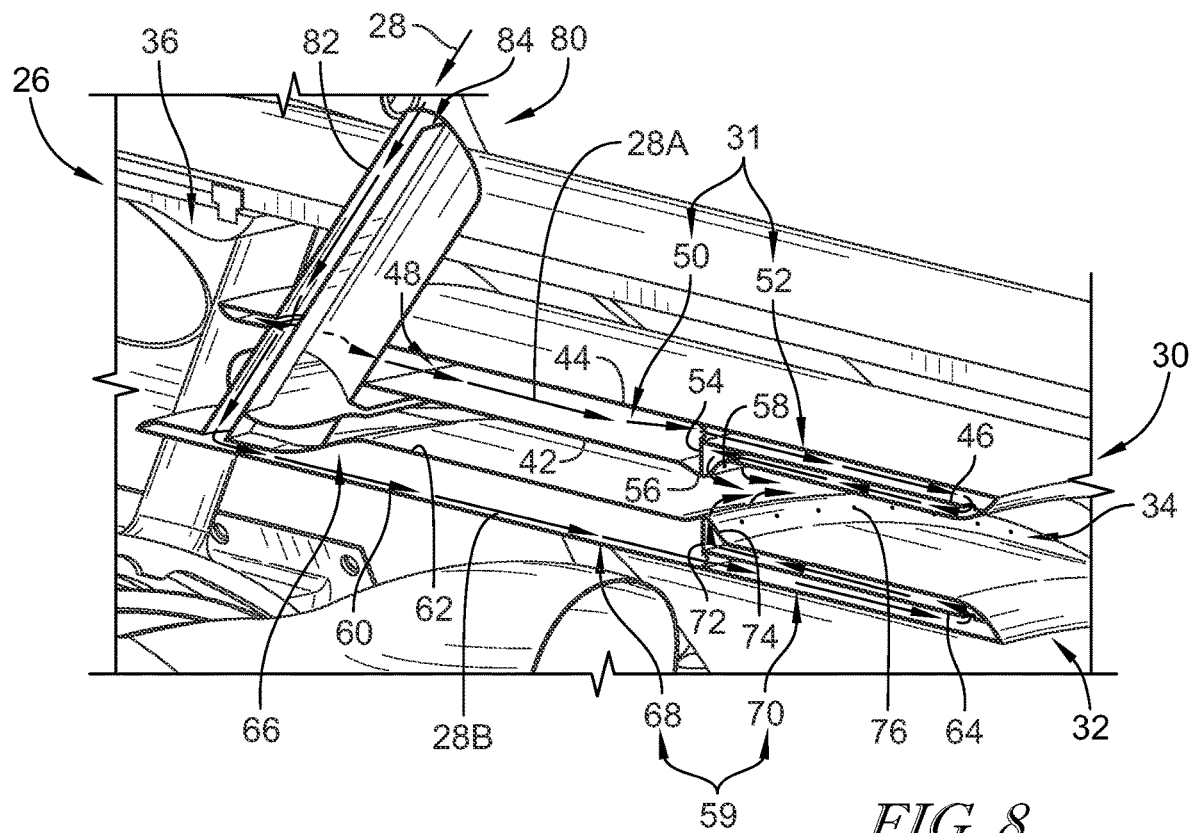
FIG. 8 is a section view of the rotating detonation augmentor of FIG. 3 showing the outer augmentor band and the inner augmentor band are hollow and configured to provide cooling circuits for the fuel to cool the outer augmentor band and the inner augmentor band as the fuel is fed into a strut, through the outer and inner augmentor bands, and to the throat of the rotating detonation augmentor for detonation.

Turning back to the rotating detonation augmentor 26, the outer augmentor band 30 is hollow in some embodiments to provide an outer fuel cooling circuit 31 for a first flow 28A of the fuel 28 to flow through to cool the outer augmentor band 30 and to reach the radial space 34 as shown in FIG. 8. The outer augmentor band 30 includes a first wall 42, a second wall 44, and a first intermediate wall 46. The first wall 42 extends circumferentially around the axis 11, and the second wall 44 extends circumferentially around the first wall 42 to locate the second wall 44 radially outward of the first wall 42. The first wall 42 and the second wall 44 form a radial hollow space 48 therebetween to define a first segment 50 of the outer fuel cooling circuit 31. The first intermediate wall 46 extends circumferentially about the axis 11 radially between the first wall 42 and the second wall 44 to define a second segment 52 of the outer fuel cooling circuit 31. An axial length of the first intermediate wall 46 is shorter than an axial length of the first wall 42 and an axial length of the second wall 44. The first segment 50 and the second segment 52 of the outer fuel cooling circuit 31 are in fluid communication with one another.

The outer augmentor band 30 further includes a partition wall 54 that extends radially between the first wall 42 and the second wall 44 to separate the first segment 50 and the second segment 52 of the outer fuel cooling circuit 31 from one another as shown in FIG. 8. An upper portion of the partition wall 54 is formed to include apertures for providing fluid communication between the first segment 50 and the second segment 52 of the outer fuel cooling circuit 31 so that the first flow 28A of the fuel 28 can flow axially aft from the first segment 50 and into the second segment 52. A lower portion of the partition wall 54 radially inward of the upper portion is formed without an aperture so that the first flow 28A of the fuel 28 is blocked from flowing axially forward from the second segment 52 and into the first segment 50.

The first wall 42 of the outer augmentor band 30 is formed to include a protrusion 56 extending radially inward toward the inner augmentor band 32 as shown in FIGS. 3 and 8. The protrusion 56 extends circumferentially about the axis 11. The protrusion 56 is formed to define a plurality of outlet holes 58 for directing the first flow 28A of the fuel 28 out of the second segment 52 of the outer fuel cooling circuit 31 and into the radial space 34 of the rotating detonation augmentor 26. The plurality of outlet holes 58 are circumferentially spaced apart from one another on the protrusion 56.

The first flow 28A of the fuel 28 flows axially aft through the radial hollow space 48 of the first segment 50 of the outer fuel cooling circuit 31 between the first wall 42 and the second wall 44 as shown in FIG. 8. The first flow 28A of the fuel 28 continues flowing axially aft through the aperture formed in the upper portion of the partition wall 54 into the second segment 52 of the outer fuel cooling circuit 31. In the second segment 52, the first flow 28A of the fuel 28 flows axially aft and radially between the second wall 44 and the first intermediate wall 46. At an axially aft end of the first intermediate wall 46, the first flow 28A of the fuel 28 turns to flow radially inward through an aperture formed in the first intermediate wall 46. Then, the first flow 28A of the fuel 28 flows axially forward through the second segment 52 radially between the first intermediate wall 46 and the first wall 42. The first flow 28A of the fuel 28 exits the second segment 52 through the plurality of outlet holes 58 formed in the protrusion 56 of the first wall 42 to enter the radial space 34 of the rotating detonation augmentor 26 as shown in FIG. 8.

The inner augmentor band 32 is hollow to provide an inner fuel cooling circuit 59 for a second flow 28B of the fuel 28 to flow through to cool the inner augmentor band 32 and to reach the radial space 34 as shown in FIG. 8. The inner augmentor band 32 includes a third wall 60, a fourth wall 62, and a second intermediate wall 64. The third wall 60 extends circumferentially around the axis 11, and the fourth wall 62 extends circumferentially around the third wall 60 to locate the fourth wall 62 radially outward of the third wall 60. The third wall 60 and the fourth wall 62 form a radial hollow space 66 therebetween to define a first segment 68 of the inner fuel cooling circuit 59. The second intermediate wall 64 extends circumferentially about the axis 11 radially between the third wall 60 and the fourth wall 62 to define a second segment 70 of the inner fuel cooling circuit 59. An axial length of the second intermediate wall 64 is shorter than an axial length of the third wall 60 and an axial length of the fourth wall 62. The first segment 68 and the second segment 70 of the inner fuel cooling circuit 59 are in fluid communication with one another.

The inner augmentor band 32 further includes a partition wall 72 that extends radially between the third wall 60 and the fourth wall 62 to separate the first segment 68 and the second segment 70 of the inner fuel cooling circuit 59 from one another as shown in FIG. 8. A lower portion of the partition wall 72 is formed to include apertures for providing fluid communication between the first segment 68 and the second segment 70 of the inner fuel cooling circuit 59 so that the second flow 28B of the fuel 28 can flow axially aft from the first segment 68 and into the second segment 70. An upper portion of the partition wall 72 radially outward of the lower portion is formed without an aperture so that the second flow 28B of the fuel 28 is blocked from flowing axially forward from the second segment 70 and into the first segment 68.

The fourth wall 62 of the inner augmentor band 32 is formed to include a protrusion 74 extending radially outward toward the outer augmentor band 30 as shown in FIGS. 3 and 8. The protrusion 74 extends circumferentially around the axis 11. The protrusion 74 is formed to define a plurality of outlet holes 76 for directing the second flow 28B of the fuel 28 out of the second segment 70 of the inner fuel cooling circuit 59 and into the radial space 34. The plurality of outlet holes 76 are circumferentially spaced apart from one another on the protrusion 74.

The second flow 28B of the fuel 28 flows axially aft through the radial hollow space 66 of the first segment 68 of the inner fuel cooling circuit 59 between the third wall 60 and the fourth wall 62 as shown in FIG. 8. The second flow 28B of the fuel 28 continues flowing axially aft through the aperture formed in the partition wall 72 and into the second segment 70 of the inner fuel cooling circuit 59. The second flow 28B of the fuel 28 flows radially between the third wall 60 and the second intermediate wall 64. At an axially aft end of the second intermediate wall 64, the second flow 28B of the fuel 28 turns to flow radially outward through an aperture formed in the second intermediate wall 64. Then, the second flow 28B of the fuel 28 flows axially forward through the second segment 70 between the second intermediate wall 64 and the fourth wall 62. The second flow 28B of the fuel 28 exits the second segment 70 through the plurality of outlet holes 76 formed in the protrusion 74 of the fourth wall 62 to enter the radial space 34 of the rotating detonation augmentor 26 as shown in FIG. 8.

The first flow 28A of the fuel 28 and the second flow 28B of the fuel 28 through the outer augmentor band 30 and the inner augmentor band 32, respectively, cool the augmentor bands 30, 32 via the cool fuel 28. The fuel 28 recaptures heat from the augmentor bands 30, 32. Thus, before entering the radial space 34 of the rotating detonation augmentor 26, the fuel 28 is heated, which decreases atomization and vaporization time of the fuel 28 within the rotating detonation augmentor 26.

The first flow 28A of the fuel 28 and the second flow 28B of the fuel 28 is fed through the protrusions 56, 74, respectively, to mix in the radial space 34 of the rotating detonation augmentor 26 as suggested in FIG. 8. The combined fuel 28 is mixed with the first portion 15A of the bypass air and ignited so as to induce a rotating detonation wave. The rotating detonation wave is constrained in the rotating detonation augmentor 26 between the augmentor bands 30, 32 such that the wave propagates circumferentially around the rotating detonation augmentor 26.

The products of the combustion reaction in the rotating detonation augmentor 26 are discharged from the rotating detonation augmentor 26 at a pressure and a temperature greater than that of a pressure and a temperature of the first portion 15A of the bypass air that entered the rotating detonation augmentor 26. The pressure and the temperature gain across the rotating detonation augmentor 26 is a result of the detonation process.

The second portion 15B of the bypass air that flows around the rotating detonation augmentor 26 is cooler than the products of the combustion reaction exiting the rotating detonation augmentor 26. The cooler second portion 15B of the bypass air mixes with the hotter combustion products axially aft of the rotating detonation augmentor 26. The second portion 15B of the bypass air may experience pressure loss due to the flow restrictions in the flow path 22 created by additional components within the bypass duct 24, such as the rotating detonation augmentor 26 and the flow valve 36. However, the pressure gain in the rotating detonation augmentor 26 offsets the potential pressure loss of the second portion 15B of the bypass air in the bypass duct 24, thus maximizing the thrust available to the gas turbine engine 10.

The protrusions 56, 74 are axially aligned with one another as shown in FIGS. 3 and 8. The protrusions 56, 74 cooperate to define a throat 78 located radially between the outer augmentor band 30 and the inner augmentor band 32. The throat 78 reduces a flow area through the rotating detonation augmentor 26 and contracts the first portion 15A of the bypass air that flows through the rotating detonation augmentor 26 to block the combustion products from flowing axially upstream through the throat 78. Thus, the throat 78 contracts the flow area and helps to maintain an axially aft flow of the gases through the rotating detonation augmentor 26.

In some embodiments, the throat 78 chokes the flow of the first portion 15A of the bypass air. In some embodiments, the throat 78 restricts the flow of the first portion 15A of the bypass air without choking the flow of the first portion 15A of the bypass air through the rotating detonation augmentor 26. Similarly, the throats of the other embodiments disclosed herein and variations thereof may be choked or un-choked.

The first flow 28A of the fuel 28 and the second flow 28B of the fuel 28 is fed into the radial space 34 of the rotating detonation augmentor 26 at the throat 78, which is the location with the highest shear of the fuel 28 and the first portion 15A of the bypass air. The fuel 28 injection at the throat 78 allows for increased mixing and transport of the fuel 28 within the radial space 34.

Though the rotating detonation augmentor 26 is shown and described as being arranged in the bypass duct 24, a rotating detonation augmentor 26' may also be arranged in the engine core 14 axially aft of the turbine 20 as shown in FIG. 2. In some embodiments, the rotating detonation augmentor 26, 26' is located in both the bypass duct 24 and the engine core 14. In some embodiments, the rotating detonation augmentor 26' is located only in the engine core 14. In some embodiments, the rotating detonation augmentor 26 is located only in the bypass duct 24.

Figure 9:
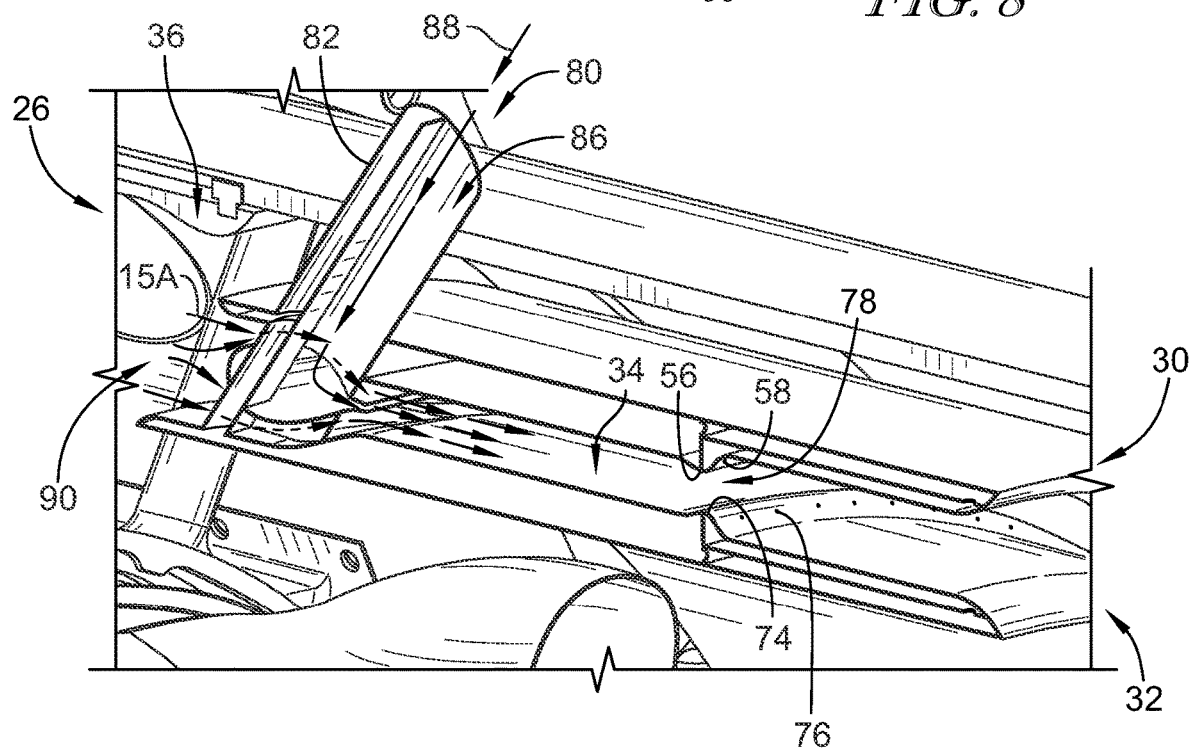
FIG. 9 is a section view of the rotating detonation augmentor similar to FIG. 8 showing the rotating detonation augmentor further includes an ejector coupled with the strut and suggesting that pressurized air is fed into the ejector and conducted into the rotating detonation augmentor upstream of the throat to increase the velocity of the bypass air fed to the rotating detonation augmentor.

The rotating detonation augmentor 26 further includes a plurality of struts 80 as shown in FIGS. 3, 8, and 9. Each strut 80 extends through and is coupled with the outer augmentor band 30 and the inner augmentor band 32. In some embodiments, the strut 80 extends from the outer wall 19 of the bypass duct 24 radially inward into the flow path 22. In some embodiments, the strut 80 extends from the inner wall 23 of the bypass duct 24 radially outward into the flow path 22. The strut 80 includes a sidewall 82 that is exposed to the first portion 15A and the second portion 15B of the bypass air flowing through the flow path 22. In the illustrative embodiment, the sidewall 82 of the strut 80 is coupled with the outer wall 19 of the bypass duct 24 to support the rotating detonation augmentor 26 relative to the outer wall 19.

A strut fuel passage 84 is formed within the sidewall 82 and extends radially into the strut 80 as shown in FIG. 8. The fuel 28 is fed into the strut fuel passage 84, from, for example, a fuel tank, through the outer augmentor band 30 and the inner augmentor band 32 to cool the augmentor bands 30, 32, and into the throat 78 of the rotating detonation augmentor 26 for detonation therein. The strut fuel passage 84 is in fluid communication with the outer fuel cooling circuit 31 and the inner fuel cooling circuit 59. The fuel 28 is fed into the strut fuel passage 84, and in the strut fuel passage 84, the first flow 28A and the second flow 28B diverge from one another. The first flow 28A of the fuel 28 flows into the outer fuel cooling circuit 31 for cooling of the outer augmentor band 30. The second flow 28B of the fuel 28 flows into the inner fuel cooling circuit 59 for cooling of the inner augmentor band 32.

The strut 80 is formed to include an air passage 86 extending therethrough for the passage of pressurized air 88 as shown in FIG. 9. The air passage 86 extends radially through the strut 80 adjacent the strut fuel passage 84. The air passage 86 is in fluid communication with the compressor 16 to receive the pressurized air 88 therefrom. The pressurized air 88 is compressor discharge air bled from later stages of the compressor 16. Though, the pressurized air 88 may come from any stage of the compressor 16.

The rotating detonation augmentor 26 includes a plurality of struts 80 spaced apart from one another circumferentially as shown in FIGS. 1 and 2. Each strut 80 is discrete and does not extend fully around the axis 11. In other embodiments, the rotating detonation augmentor 26 includes a single strut 80.

The rotating detonation augmentor 26 further includes an ejector ring 90 coupled with the strut 80 as shown in FIGS. 3 and 9. The ejector ring 90 is located radially between the outer augmentor band 30 and the inner augmentor band 32 and axially forward of the throat 78. The ejector ring 90 extends circumferentially around the axis 11. The air passage 86 formed in the strut 80 is in fluid communication with the ejector ring 90. The pressurized air 88 is fed into the air passage 86 of the strut 80 and directed radially inward toward the ejector ring 90. The ejector ring 90 directs the pressurized air 88 into the radial space 34 of the rotating detonation augmentor 26.

As shown in FIG. 9, the pressurized air 88 and the first portion 15A of the bypass air flowing through the rotating detonation augmentor 26 mix in the radial space 34. The pressurized air 88 increases a velocity and a pressure of the mixture of the first portion 15A of the bypass air and the pressurized air 88 within the rotating detonation augmentor 26. If the pressure is too low in the rotating detonation augmentor 26, the rotating detonation wave may not be adequately sustained. Thus, the pressurized air 88 increases the pressure of the mixture of the first portion 15A of the bypass air and the pressurized air 88 flowing axially aft through the rotating detonation augmentor 26 and may ensure adequate propagation of the rotating detonation wave.

The gas turbine engine 10 further includes an actuator 92 to move the flow valve 36 between the first position and the second position and a controller 94 as shown in FIGS. 3 and 4. The actuator 92 is arranged radially outward of the outer wall 19 of the bypass duct 24 such that the actuator 92 is located outside of the flow path 22 in illustrative embodiments. The controller 94 selectively controls the actuator 92, injection of fuel 28 into the radial space 34, and injection of pressurized air 88 into the radial space 34. In response to receiving a first command signal indicative of operation of the rotating detonation augmentor 26 from the controller 94, the actuator 92 translates the flow valve 36 axially aft to assume the first position as shown in FIG. 3. Also in response to the first command signal, the fuel 28 is directed through the strut fuel passage 84 of the strut 80. In some embodiments, the first command signal also directs the pressurized air 88 to flow through the air passage 86 of the strut 80.

In response to receiving a second command signal indicative of stopping operation of the rotating detonation augmentor 26 from the controller 94, the actuator 92 translates the flow valve 36 axially forward to assume the second position as shown in FIG. 4. Also in response to the second command signal, the fuel 28 stops flowing through the strut fuel passage 84 of the strut 80. In some embodiments, the second command signal also directs the pressurized air 88 to stop flowing through the air passage 86 of the strut 80.

The command signals may be generated manually by a pilot or may be automatically generated based on an operating condition of the gas turbine engine 10, an external condition, or a combination of such. The operating condition may include at least one of take-off, climb, cruise, descent, and landing of an aircraft having the gas turbine engine 10.

Figure 5:
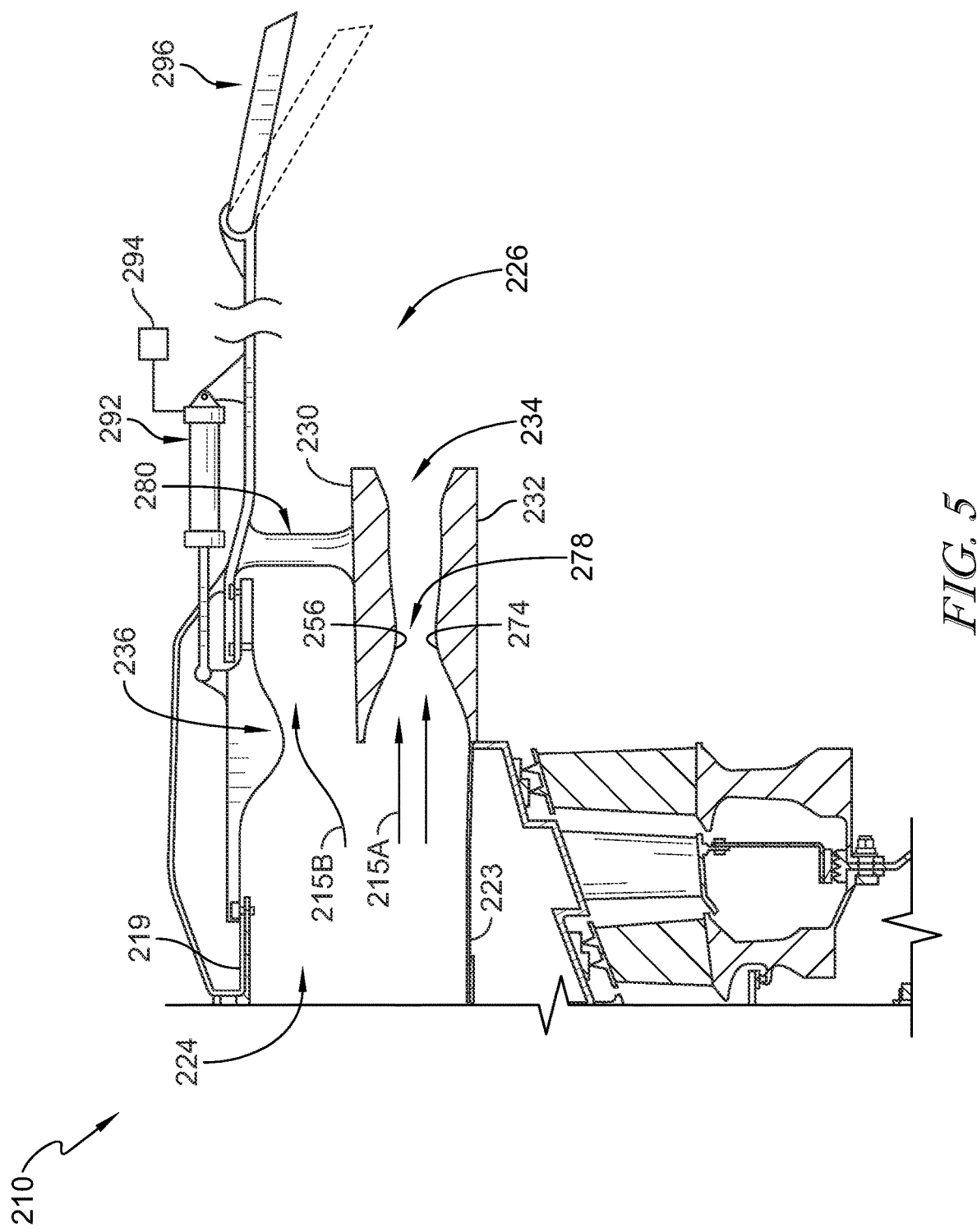
FIG. 5 is an enlarged section view of a gas turbine engine having another embodiment of a rotating detonation augmentor and a flow valve showing that an inner wall of a bypass duct provides an inner augmentor band of the rotating detonation augmentor.

Another embodiment of a rotating detonation augmentor 226 in accordance with the present disclosure is shown in FIG. 5. The rotating detonation augmentor 226 is substantially similar to the rotating detonation augmentor 26 shown in FIGS. 2-4, 8, and 9 and described herein. Accordingly, similar reference numbers in the 200 series indicate features that are common between the rotating detonation augmentor 26 and the rotating detonation augmentor 226. The description of the rotating detonation augmentor 26 is incorporated by reference to apply to the rotating detonation augmentor 226, except in instances when it conflicts with the specific description and the drawings of the rotating detonation augmentor 226.

The rotating detonation augmentor 226 is arranged in a bypass duct 224 of a gas turbine engine 210 as shown in FIG. 5. In the illustrative embodiment, an inner wall 223 of the bypass duct 224 provides the inner augmentor band 232 of the rotating detonation augmentor 226. An outer augmentor band 230 of the rotating detonation augmentor 226 is arranged radially outward of and axially aligned with the inner augmentor band 232. The outer augmentor band 230 and the inner augmentor band 232 cooperate to form a radial space 234 therebetween. The rotating detonation augmentor 226 includes a strut 280 coupled with the outer augmentor band 230 and an outer wall 219 of the bypass duct 224 to support the outer augmentor band 230 relative to the bypass duct 224. An ejector, similar to ejector 90 may be coupled with the strut 280 to provide pressurized air to the rotating detonation augmentor 226.

In some embodiments, the inner wall of the bypass duct and the inner augmentor band are integrally formed as a single, one-piece component as shown in FIG. 5. In some embodiments, the inner augmentor band and the inner wall 223 are separate components that are radially aligned with one another as shown in FIGS. 3 and 4. In some embodiments, the outer wall of the bypass duct and the outer augmentor band are integrally formed as a single, one-piece component. In some embodiments, the outer augmentor band and the outer wall are separate components that are radially aligned with one another as shown in FIGS. 3 and 4.

The gas turbine engine 210 includes a flow valve 236 coupled with the outer wall 219 of the bypass duct 224 as shown in FIG. 5. The flow valve 236 axially translates relative to the outer wall 219 and the rotating detonation augmentor 226 between a first position, as shown in FIG. 5, and a second position. The flow valve 236 is closer to the rotating detonation augmentor 226 in the first position as compared to the second position, like the flow valve 36 of the gas turbine engine 10.

The flow valve 236 is in the first position, as shown in FIG. 5, in response to the rotating detonation augmentor 226 being operated. In the first position, because the flow valve 236 is closer to the rotating detonation augmentor 226, more bypass air is forced through the rotating detonation augmentor 226 (i.e., a first portion 215A of the bypass air) instead of flowing around and bypassing the rotating detonation augmentor 226. The flow valve 236 is in the second position in response to the rotating detonation augmentor 226 not being operated. In the second position, the flow valve 236 is farther from the rotating detonation augmentor 226 to allow more bypass air to flow around and bypass the rotating detonation augmentor 226 (i.e., a second portion 215B of the bypass air) instead of flowing through the rotating detonation augmentor 226.

The outer augmentor band 230 is formed to include a protrusion 256 that extends radially inward toward the inner augmentor band 232 as shown in FIG. 5. The inner augmentor band 232 is formed to include a protrusion 274 that extends radially outward toward the outer augmentor band 230. The protrusions 256, 274 are axially aligned with one another to cooperate to define a throat 278 located radially between the outer augmentor band 230 and the inner augmentor band 232. The throat 278 contracts a flow area of a first portion 215A of the bypass air flowing through the rotating detonation augmentor 226.

In the illustrative embodiment, the strut 280 and bands 230, 232 are shown as being solid without fuel or air circuits. In some embodiments, the strut 280 is formed to include a strut fuel passage extending therethrough. Fuel flows through the strut fuel passage and into an outer fuel cooling circuit formed in the outer augmentor band 230 and an inner fuel cooling circuit formed in the inner augmentor band 232 to cool the respective bands 230, 232. The fuel then flows into the radial space 234 of the rotating detonation augmentor 226 for detonation therein.

The gas turbine engine 210 further includes an actuator 292 to axially move the flow valve 236 and a controller 294 as shown in FIG. 5. The actuator 292 is arranged radially outward of the outer wall 219 of the bypass duct 224. The controller 294 selectively controls the actuator 292 and the injection of fuel into the radial space 234. In response to receiving a first command signal indicative of operation of the rotating detonation augmentor 226 from the controller 294, the actuator 292 translates the flow valve 236 axially aft to assume the first position as shown in FIG. 5. In response to receiving a second command signal indicative of stopping operation of the rotating detonation augmentor 226 from the controller 294, the actuator 292 translates the flow valve 236 axially forward to assume the second position.

The gas turbine engine 210 further includes a nozzle 296 coupled with the outer wall 219 of the bypass duct 224 as shown in FIG. 5. The nozzle 296 pivots between a first position, as shown in FIG. 5, and a second position, as suggested in FIG. 5. In the first position, the nozzle 296 is substantially radially aligned with the outer wall 219 and extends generally axially aft. In the second position, the nozzle 296 extends radially inward and axially aft from the outer wall 219. The first position of the nozzle 296 helps to direct the thrust for the gas turbine engine 10 while the rotating detonation augmentor 226 is operational.

Figure 6:
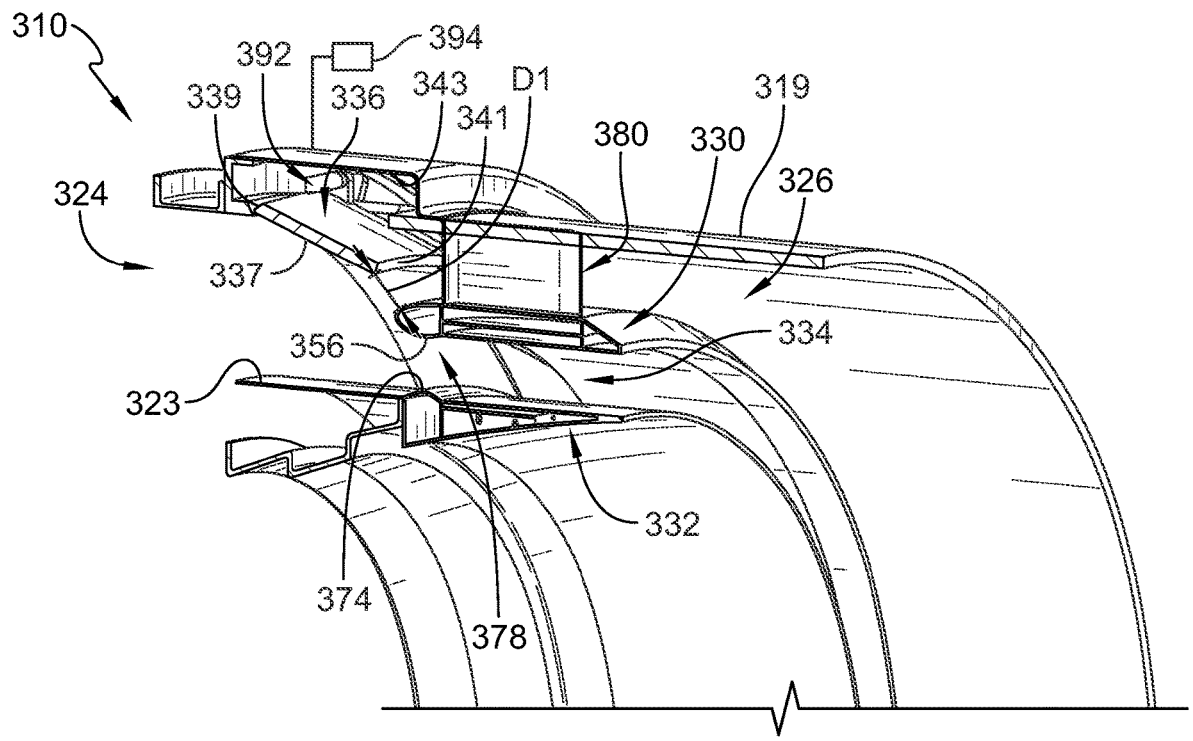
FIG. 6 is a perspective and section view of a gas turbine engine having another embodiment of a rotating detonation augmentor and a flow valve showing that an inner wall of a bypass duct provides an inner augmentor band of the rotating detonation augmentor and that the flow valve includes a flap in a first position to cause a space between the flow valve and the rotating detonation augmentor to be relatively closed to cause less bypass air to flow around the augmentor and to increase the amount of bypass air flowing into the rotating detonation augmentor while the rotating detonation augmentor is being operated.
Figure 7:
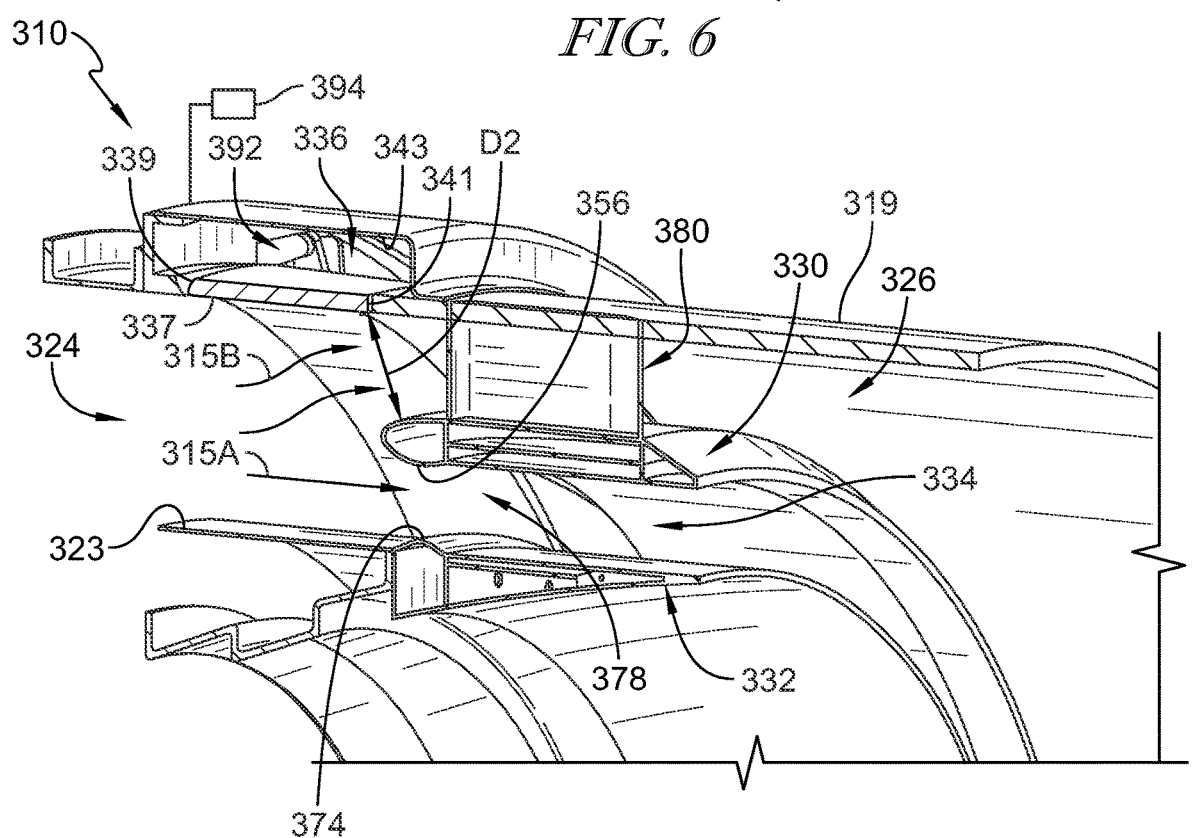
FIG. 7 is an enlarged section view of the gas turbine engine of FIG. 6 showing the flap of the flow valve in a second position wherein a space between the flow valve and the rotating detonation augmentor is opened and larger to allow more bypass air to flow around the augmentor and minimize pressure losses in the bypass duct while the rotating detonation augmentor is not being operated.

Another embodiment of a rotating detonation augmentor 326 in accordance with the present disclosure is shown in FIGS. 6 and 7. The rotating detonation augmentor 326 is substantially similar to the rotating detonation augmentor 26 shown in FIGS. 2-4, 8, and 9 and described herein and the rotating detonation augmentor 226 shown in FIG. 5 and described herein. Accordingly, similar reference numbers in the 300 series indicate features that are common between the rotating detonation augmentor 26, the rotating detonation augmentor 226, and the rotating detonation augmentor 326. The description of the rotating detonation augmentor 26 and the rotating detonation augmentor 226 are incorporated by reference to apply to the rotating detonation augmentor 326, except in instances when it conflicts with the specific description and the drawings of the rotating detonation augmentor 326.

The rotating detonation augmentor 326 is arranged in a bypass duct 324 of a gas turbine engine 310 as shown in FIGS. 6 and 7. In the illustrative embodiment, an inner wall 323 of the bypass duct 324 provides an inner augmentor band 332 of the rotating detonation augmentor 326. A radially-outward facing surface of the inner wall 323 and a radially-outward facing surface of the inner augmentor band 332 are formed as a continuous surface. An outer augmentor band 330 of the rotating detonation augmentor 326 is arranged radially outward of the inner augmentor band 332 to define a radial space 334 therebetween.

The rotating detonation augmentor 326 includes a strut 380 as shown in FIGS. 6 and 7. The strut 380 is coupled with the outer augmentor band 330 and an outer wall 319 of the bypass duct 324 for support of the outer augmentor band 330 relative to the bypass duct 324.

In some embodiments, the inner wall 323 of the bypass duct 324 and the inner augmentor band 332 are integrally formed as a single, one-piece component. In some embodiments, the inner augmentor band 332 and the inner wall 323 are separate components that are radially aligned with one another. In some embodiments, the outer wall 319 of the bypass duct 324 and the outer augmentor band 330 are integrally formed as a single, one-piece component. In some embodiments, the outer augmentor band 330 and the outer wall 319 are separate components that are radially aligned with one another.

The gas turbine engine 310 includes a flow valve 336 coupled with the outer wall 319 of the bypass duct 324 as shown in FIGS. 6 and 7. The flow valve 336 includes a flap 337, which may also be referred to as a panel or petal, that moves relative to the outer wall 319 between a first position, as shown in FIG. 6, and a second position, as shown in FIG. 7. An entirety of the flap 337 is located axially forward of an entirety of the rotating detonation augmentor 326. Though the flow valve 336 is described and shown as coupled with the outer wall 319, in some embodiments, the flow valve 336 may be coupled with the inner wall 323 of the bypass duct 324.

The outer wall 319 of the bypass duct 324 is formed to include a recess 343 extending radially outward and circumferentially around an axis of the gas turbine engine 310 as shown in FIGS. 6 and 7. The flap 337 is arranged in the recess 343. The flap 337 includes an axially forward end 339 and an axially aft end 341 opposite the axially forward end 339. The axially forward end 339 is pivotably coupled with the outer wall 319. The axially aft end 341 moves radially relative to the outer wall 319 in response to the flap 337 being pivoted as suggested in FIGS. 6 and 7.

In the first position of the flap 337, the axially aft end 341 moves radially inward toward the inner wall 323 as shown in FIG. 6. A first distance D1 is formed between the axially aft end 341 of the flap 337 and the outer augmentor band 330. Due to the first distance D1, the flap 337 and the rotating detonation augmentor 326 are relatively close to cause less bypass air (i.e., a second portion 315B of the bypass air) to flow around the rotating detonation augmentor 326 and to increase an amount of a first portion 315A of the bypass air flowing into the rotating detonation augmentor 326 while the rotating detonation augmentor 326 is being operated.

In the second position of the flap 337, the axially aft end 341 moves radially outward away from the inner wall 323, as shown in FIG. 7, so that a radially-inward facing surface of the flap 337 and a radially-inward facing surface of the outer wall 319 are flush with one another and form a continuous inner surface of the outer wall 319. In the second position of the flap 337, the flap 337 forms part of the outer wall 319. A second distance D2 is formed between the axially aft end 341 of the flap 337 and the outer augmentor band 330 while the flap 337 is in the second position. The second distance D2 is greater than the first distance D1. Due to the second distance D2, the flap 337 and the rotating detonation augmentor 326 are relatively far apart to cause more bypass air (i.e., the second portion 315B of the bypass air) to flow around the rotating detonation augmentor 326 while the rotating detonation augmentor 326 is not being operated.

The outer augmentor band 330 is formed to include a protrusion 356 that extends radially inward toward the inner augmentor band 332 as shown in FIGS. 6 and 7. The inner augmentor band 332 is formed to include a protrusion 374 that extends radially outward toward the outer augmentor band 330. The protrusions 356, 374 are axially aligned with one another to cooperate to define a throat 378 located radially between the outer augmentor band 330 and the inner augmentor band 332. The throat 378 reduces a flow area of the first portion 315A of the bypass air that flows through the rotating detonation augmentor 326 to prevent combustion products from flowing axially forward through the throat 378.

In some embodiments, the strut 380 is formed to include a strut fuel passage extending therethrough. Fuel flows through the strut fuel passage and into an outer fuel cooling circuit formed in the outer augmentor band 330 to cool the outer augmentor band 330. The fuel then flows into the radial space 334 of the rotating detonation augmentor 326 for detonation therein.

The gas turbine engine 310 further includes an actuator 392 with a cam or other lever system to pivot the flap 337 and a controller 394 as shown in FIGS. 6 and 7. The actuator 392 is coupled with the axially forward end 339 of the flap 337. The controller 394 selectively controls the actuator 392 and the injection of fuel into the radial space 334. In response to receiving a first command signal indicative of operation of the rotating detonation augmentor 326 from the controller 394, the actuator 392 pivots the flap 337 so that the axially aft end 341 moves radially inward as shown in FIG. 6. Also in response to the first command signal, the fuel is directed through the strut fuel passage of the strut 380 and into the radial space 334 for detonation therein.

In response to receiving a second command signal indicative of stopping operation of the rotating detonation augmentor 326 from the controller 394, the actuator 392 pivots the flap 337 so that the axially aft end 341 moves radially outward as shown in FIG. 7. Also in response to the second command signal, the fuel stops flowing through the strut fuel passage of the strut 380. An ejector, similar to ejector 90 may be coupled with the strut 380 to provide pressurized air to the rotating detonation augmentor 326.

Figure 10:
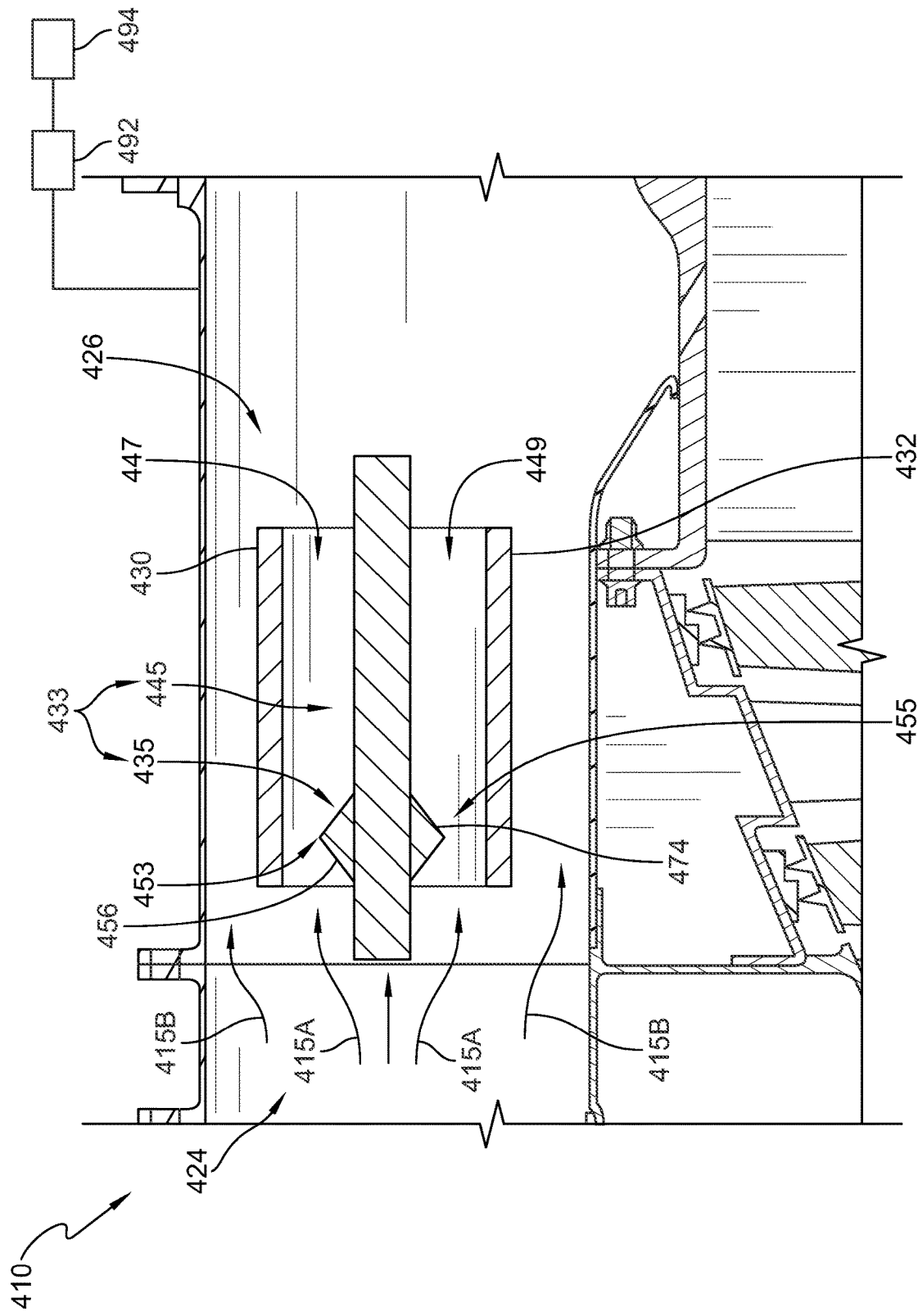
FIG. 10 is a section view of a gas turbine engine having another embodiment of a rotating detonation augmentor having an outer augmentor band, an inner augmentor band, and a throat-control band in a first position in which the throat-control band cooperates with the outer augmentor band to define a first throat therebetween and cooperates with the inner augmentor band to define a second throat therebetween during operation of the rotating detonation augmentor.
Figure 11:
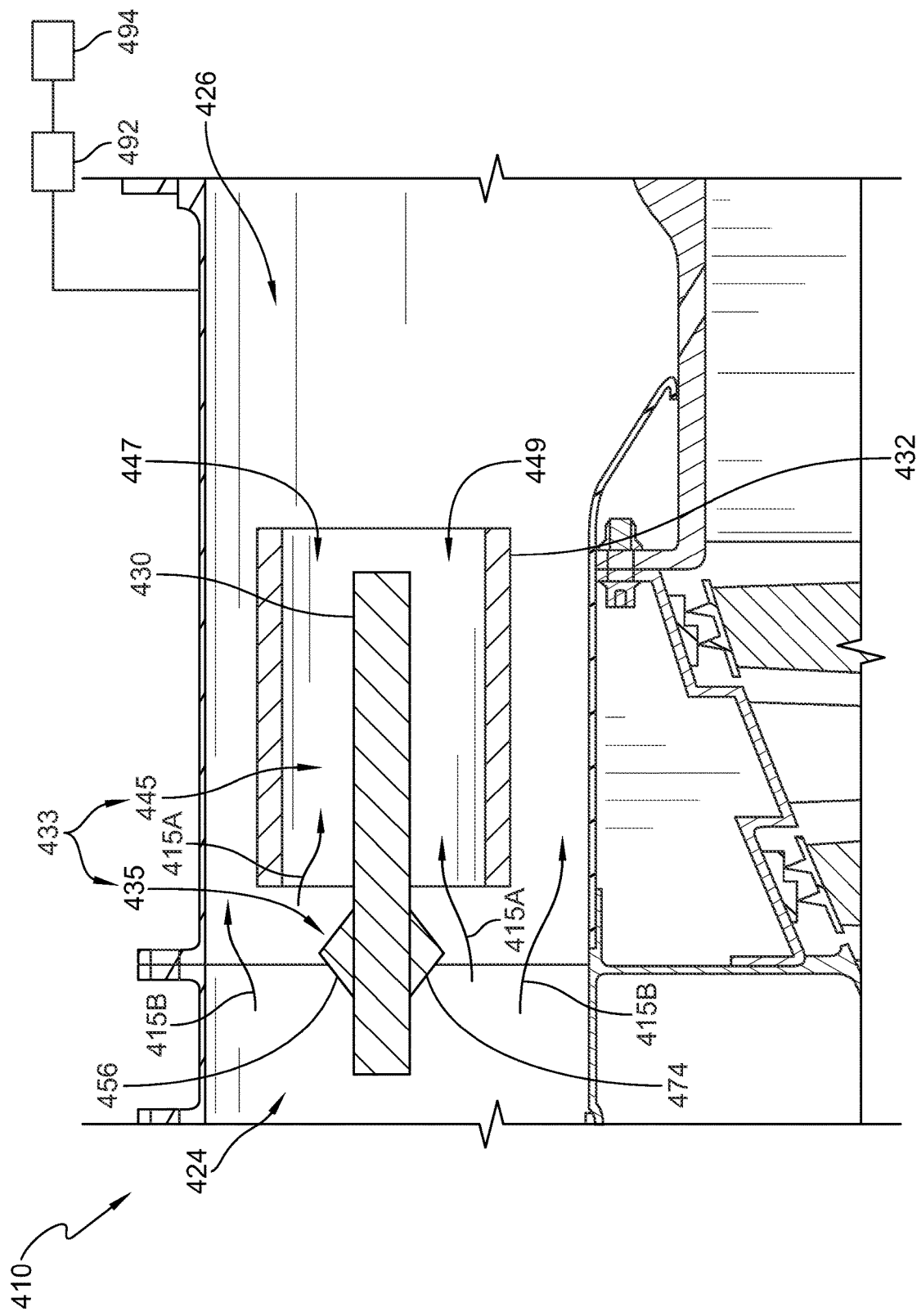
FIG. 11 is a section view of the gas turbine engine of FIG. 10 showing the throat-control band in a second position in which the throat-control band is moved axially relative to the outer augmentor band and the inner augmentor band so that the first and second throats are removed to allow the bypass air to flow freely between the inner augmentor band and the outer augmentor band to minimize pressure losses in the bypass duct when the rotating detonation augmentor is not being operated.

Another embodiment of a rotating detonation augmentor 426 in accordance with the present disclosure is shown in FIGS. 10 and 11. The rotating detonation augmentor 426 is substantially similar to the rotating detonation augmentor 26 shown in FIGS. 2-4, 8, and 9 and described herein, the rotating detonation augmentor 226 shown in FIG. 5 and described herein, and the rotating detonation augmentor 326 shown in FIGS. 6 and 7 and described herein. Accordingly, similar reference numbers in the 400 series indicate features that are common between the rotating detonation augmentor 26, the rotating detonation augmentor 226, the rotating detonation augmentor 326, and the rotating detonation augmentor 426. The description of the rotating detonation augmentor 26, the rotating detonation augmentor 226, and the rotating detonation augmentor 326 are incorporated by reference to apply to the rotating detonation augmentor 426, except in instances when it conflicts with the specific description and the drawings of the rotating detonation augmentor 426.

The rotating detonation augmentor 426 is arranged in a bypass duct 424 of a gas turbine engine 410 as shown in FIGS. 10 and 11. The rotating detonation augmentor 426 includes an outer augmentor band 430 and an inner augmentor band 432 axially aligned with the outer augmentor band 430. The inner augmentor band 432 and the outer augmentor band 430 are both annular, and the outer augmentor band 430 is located radially outward of the inner augmentor band 432. An axial length of the outer augmentor band 430 is substantially similar to an axial length of the inner augmentor band 432.

The rotating detonation augmentor 426 further includes a throat-control band 433 located radially between the outer augmentor band 430 and the inner augmentor band 432 as shown in FIGS. 10 and 11. An axial length of the throat-control band 433 is greater than the axial length of the outer augmentor band 430 and the inner augmentor band 432 so that a portion of the throat-control band 433 extends axially forward and axially aft beyond the outer augmentor band 430 and the inner augmentor band 432 in the illustrative embodiment. A first chamber 447 is formed radially between the outer augmentor band 430 and the throat-control band 433. A second chamber 449 is formed radially between the inner augmentor band 432 and the throat-control band 433. A first portion 415A of the bypass air flows through both the first chamber 447 and the second chamber 449 and a second portion 415B of bypass air flows around the rotating detonation augmentor 426. As discussed above, the embodiments of FIGS. 3-9 may include intermediate bands that are fixed or movable to provide multiple chambers for the rotating detonation augmentors.

The throat-control band 433 includes a ring segment 445 extending circumferentially relative to an axis of the gas turbine engine 410 and a throat body 435 as shown in FIGS. 10 and 11. The throat body 435 extends radially away from the ring segment 445. The throat body 435 includes a first protrusion 456 and a second protrusion 474 as shown in FIGS. 10 and 11. The first protrusion 456 extends radially outward from the ring segment 445 toward the outer augmentor band 430, and the second protrusion 474 extends radially inward from the ring segment 445 toward the inner augmentor band 432. The first protrusion 456 and the second protrusion 474 are axially aligned with one another. The throat-control band 433 axially translates relative to the outer augmentor band 430 and the inner augmentor band 432 between a first position, as shown in FIG. 10, and a second position, as shown in FIG. 11.

The throat-control band 433 is in the first position, as shown in FIG. 10, in response to operation of the rotating detonation augmentor 426. In the first position, the first protrusion 456 of the throat body 435 cooperates with the outer augmentor band 430 to define a first throat 453 therebetween. The first throat 453 is located in the first chamber 447. The second protrusion 474 cooperates with the inner augmentor band 432 to define a second throat 455 therebetween. The second throat 455 is located in the second chamber 449. The first and second throats 453, 455 reduce a flow area of the first portion 415A of the bypass air flowing through the first chamber 447 and the second chamber 449, respectively. In the first position of the throat-control band 433, an axially-forward end of the throat body 435 is axially aligned with an axially-forward end of the outer augmentor band 430 and an axially-forward end of the inner augmentor band 432 such that an entirety of the protrusions 456, 474 is located radially between the outer augmentor band 430 and the inner augmentor band 432.

The throat-control band 433 is in the second position in response to the rotating detonation augmentor 426 not being operated as shown in FIG. 11. In the second position, the throat-control band 433 moves axially forward relative to the outer augmentor band 430 and the inner augmentor band 432. In other embodiments, the throat-control band 433 moves axially aft to cause the protrusions 456, 474 to be aft of the bands 430, 432. In the second position, the first protrusion 456 and the second protrusion 474 of the throat body 435 are axially misaligned with the outer augmentor band 430 and the inner augmentor band 432 so that the entirety or at least a portion of the protrusions 456, 474 is located axially forward of the axially-forward end of both of the outer augmentor band 430 and the inner augmentor band 432.

Because the protrusions 456, 474 is located axially forward of the outer augmentor band 430 and the inner augmentor band 432, the throats 453, 455 are not formed while the throat-control band 433 is in the second position. Thus, in the second position, the first portion 415A of the bypass air flowing through the first chamber 447 and the second chamber 449 is unrestricted, thereby allowing the first portion 415A of the bypass air to flow freely through the rotating detonation augmentor 426. The removal of the throats 453, 455 in the second position minimizes pressure losses in the bypass duct 424 while the rotating detonation augmentor 426 is not being operated.

In some embodiments, the rotating detonation augmentor 426 may include a strut for support of the rotating detonation augmentor 426 relative to the bypass duct 424. Additionally, the strut may provide a strut fuel passage such that fuel is injected into the first chamber 447 and the second chamber 449 of the rotating detonation augmentor 426 for detonation therein. An ejector, similar to ejector 90 may be coupled with the strut to provide pressurized air to the rotating detonation augmentor.

In some embodiments, the gas turbine engine 410 further includes an actuator 492 to axially move the throat-control band 433 and a controller 494 as shown in FIGS. 10 and 11. The actuator 492 moves the throat-control band 433 between the first position and the second position. The controller 494 selectively controls the actuator 492 and the injection of fuel into the first chamber 447 and the second chamber 449. In response to receiving a first command signal indicative of operation of the rotating detonation augmentor 426 from the controller 494, the actuator 492 translates the throat-control band 433 axially aft to assume the first position as shown in FIG. 10. Also in response to the first command signal, the fuel is directed into the first chamber 447 and the second chamber 449. In response to receiving a second command signal indicative of stopping operation of the rotating detonation augmentor 426 from the controller 494, the actuator 492 translates the throat-control band 433 axially forward to assume the second position as shown in FIG. 11. Also in response to the second command signal, the fuel stops flowing into the first chamber 447 and the second chamber 449.

Figure 12:
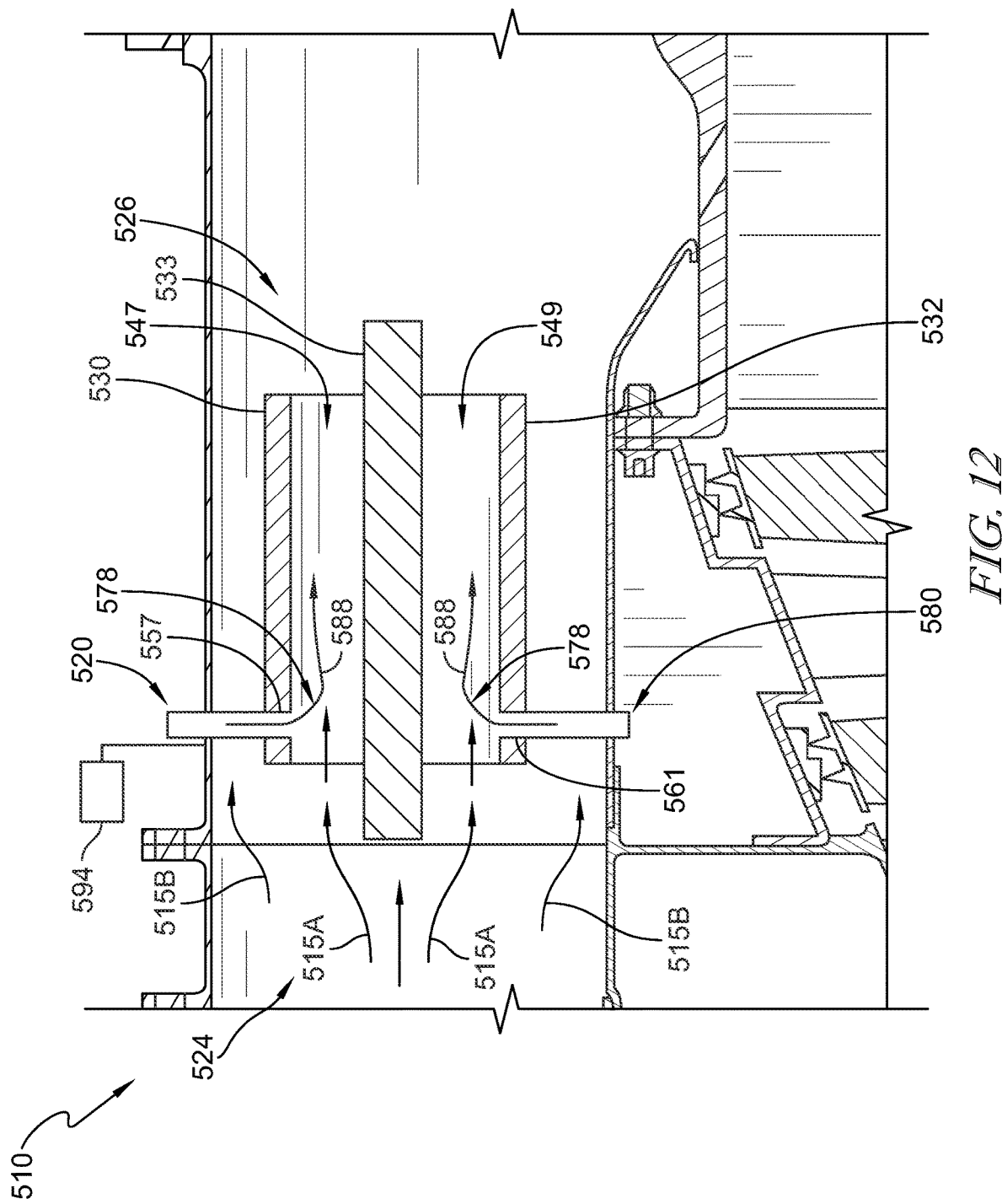
FIG. 12 is a section view of a gas turbine engine having another embodiment of a rotating detonation augmentor having an outer augmentor band, an inner augmentor band, and a source of high pressure air that directs selectively pressurized air, having a pressure greater than a pressure of the bypass air flowing through the bypass duct, into a space radially between the outer augmentor band and the inner augmentor band to provide the throat during operation of the rotating detonation augmentor.

Another embodiment of a rotating detonation augmentor 526 in accordance with the present disclosure is shown in FIG. 12. The rotating detonation augmentor 526 is substantially similar to the rotating detonation augmentor 26 shown in FIGS. 2-4, 8, and 9 and described herein, the rotating detonation augmentor 226 shown in FIG. 5 and described herein, the rotating detonation augmentor 326 shown in FIGS. 6 and 7 and described herein, and the rotating detonation augmentor 426 shown in FIGS. 10 and 11 and described herein. Accordingly, similar reference numbers in the 500 series indicate features that are common between the rotating detonation augmentor 26, the rotating detonation augmentor 226, the rotating detonation augmentor 326, the rotating detonation augmentor 426, and the rotating detonation augmentor 526. The description of the rotating detonation augmentor 26, the rotating detonation augmentor 226, the rotating detonation augmentor 326, and the rotating detonation augmentor 426 are incorporated by reference to apply to the rotating detonation augmentor 526, except in instances when it conflicts with the specific description and the drawings of the rotating detonation augmentor 526.

The rotating detonation augmentor 526 is arranged in a bypass duct 524 of a gas turbine engine 510 as shown in FIG. 12. The rotating detonation augmentor 526 includes an outer augmentor band 530 and an inner augmentor band 532 axially aligned with the outer augmentor band 530. The inner augmentor band 532 and the outer augmentor band 530 are both annular, and the outer augmentor band 530 is located radially outward of the inner augmentor band 532. An axial length of the outer augmentor band 530 is substantially similar to an axial length of the inner augmentor band 532.

The rotating detonation augmentor 526 further includes a mid augmentor band 533 located radially between the outer augmentor band 530 and the inner augmentor band 532 as shown in FIG. 12. An axial length of the mid augmentor band 533 is greater than the axial length of the outer augmentor band 530 and the inner augmentor band 532 in the illustrative embodiment, but may be substantially the same length in other embodiments. A first chamber 547 is formed radially between the outer augmentor band 530 and the mid augmentor band 533. A second chamber 549 is formed radially between the inner augmentor band 532 and the mid augmentor band 533. A first portion 515A of the bypass air flows through both the first chamber 547 and the second chamber 549 and a second portion 515B of the bypass air flows around the rotating detonation augmentor 526. In some embodiments, the mid augmentor band 533 may be omitted and the rotating detonation augmentor 526 may be formed to include a single chamber.

The outer augmentor band 530 is formed to include a first passageway 557 extending therethrough as shown in FIG. 12. The inner augmentor band 532 is formed to include a second passageway 561 extending therethrough. In the illustrative embodiment, the second passageway 561 is axially aligned with the first passageway 557.

The gas turbine engine 510 includes a source of high pressure air 580 as shown in FIG. 12. In some embodiments, the source of high pressure air 580 is a strut formed to include an air passageway in fluid communication with a compressor, similar to the strut 80 described in relation to FIG. 9. The source of high pressure air 580 is fluidly coupled with the first passageway 557 and the second passageway 561. Pressurized air 588 is selectively directed from the compressor, as the source of high pressure air 580, to the first passageway 557, and into the first chamber 547. The pressurized air 588 is also selectively directed from the compressor to the second passageway 561, and into the second chamber 549.

The pressurized air 588 is compressor discharge air bled from, for example, mid-stages of the compressor. Though, the pressurized air 588 may come from any stage of the compressor or from another source entirely. The pressurized air 588 has a pressure greater than the bypass air, such as the first portion 515A of the bypass air prior to entering the rotating detonation augmentor 526.

While the rotating detonation augmentor 526 is being operated, the pressurized air 588 is injected into the chambers 547, 549 to form a fluidic throat 578 in both chambers 547, 549. The pressurized air 588 mixes with the first portion 515A of the bypass air flowing through the rotating detonation augmentor 526. The pressurized air 588 forces the first portion 515A of the bypass air flowing through the rotating detonation augmentor 526 to continue flowing axially aft such that the gases do not flow axially forward.

While the rotating detonation augmentor 526 is not being operated, the pressurized air 588 is not injected into the chambers 547, 549 such that no fluidic throat is formed.

Thus, the first portion 515A of the bypass air is free to flow through the rotating detonation augmentor 526 with no flow obstruction in the form of a fluidic throat.

In some embodiments, the rotating detonation augmentor 526 may include a strut for support of the rotating detonation augmentor 526 relative to the bypass duct 524. Additionally, the strut may provide a strut fuel passage such that fuel is injected into the first chamber 547 and the second chamber 549 of the rotating detonation augmentor 526 for detonation therein. An ejector, similar to ejector 90 may be coupled with the strut to provide pressurized air to the rotating detonation augmentor.

The gas turbine engine 510 includes a controller 594 configured to selectively control the flow of the pressurized air 588 as shown in FIG. 12. In response to receiving a first command signal indicative of operation of the rotating detonation augmentor 526 from the controller 594, the source of high pressure air 580 directs the pressurized air 588 into the chambers 547, 549 so that the fluidic throat is formed. In response to receiving a second command signal indicative of stopping operation of the rotating detonation augmentor 526 from the controller 594, the source of high pressure air 580 stops the flow of the pressurized air 588 into the chambers 547, 549 so that the fluidic throat is removed.

Figure 13:
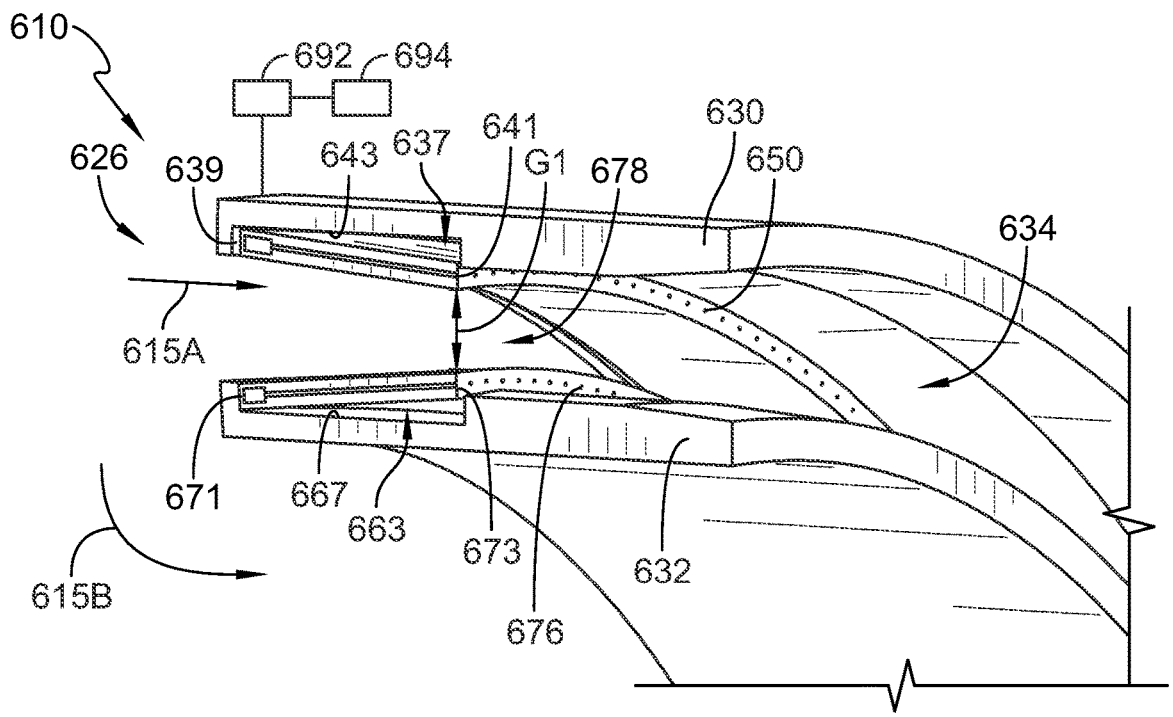
FIG. 13 is a section view of a gas turbine engine having another embodiment of a rotating detonation augmentor having an outer augmentor band, an inner augmentor band, and flow restriction means that include an outer flap coupled with the outer augmentor band and an inner flap coupled with the inner augmentor band and showing the outer and inner flaps arranged in a first position in which the outer flap and the inner flap cooperate to define a throat during operation of the rotating detonation augmentor.
Figure 14:
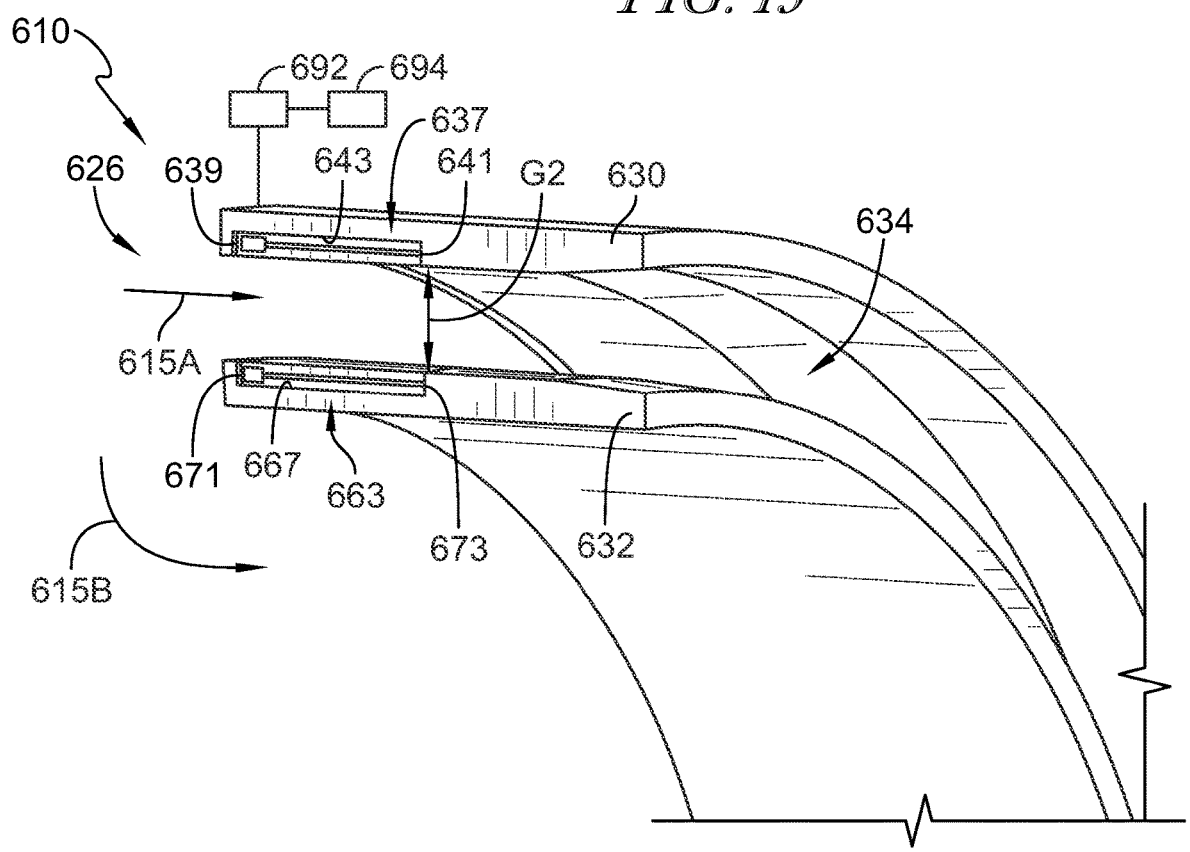
FIG. 14 is a section view similar to FIG. 13 showing the outer flap and the inner flap in a second position in which the outer and inner flaps are moved radially away from one another to open the flow and remove the throat to allow the bypass air to flow freely between the inner augmentor band and the outer augmentor band to minimize pressure losses in the bypass duct when the rotating detonation augmentor is not being operated.

Another embodiment of a rotating detonation augmentor 626 in accordance with the present disclosure is shown in FIGS. 13 and 14. The rotating detonation augmentor 626 is substantially similar to the rotating detonation augmentor 26 shown in FIGS. 2-4, 8, and 9 and described herein, the rotating detonation augmentor 226 shown in FIG. 5 and described herein, the rotating detonation augmentor 326 shown in FIGS. 6 and 7 and described herein, the rotating detonation augmentor 426 shown in FIGS. 10 and 11 and described herein, and the rotating detonation augmentor 526 shown in FIG. 12 and described herein. Accordingly, similar reference numbers in the 600 series indicate features that are common between the rotating detonation augmentor 26, the rotating detonation augmentor 226, the rotating detonation augmentor 326, the rotating detonation augmentor 426, the rotating detonation augmentor 526, and the rotating detonation augmentor 626. The description of the rotating detonation augmentor 26, the rotating detonation augmentor 226, the rotating detonation augmentor 326, the rotating detonation augmentor 426, and the rotating detonation augmentor 526 are incorporated by reference to apply to the rotating detonation augmentor 626, except in instances when it conflicts with the specific description and the drawings of the rotating detonation augmentor 626.

The rotating detonation augmentor 626 is arranged in a bypass duct of a gas turbine engine 610 as shown in FIGS. 13 and 14. The rotating detonation augmentor 626 includes an outer augmentor band 630 and an inner augmentor band 632 axially aligned with the outer augmentor band 630 as shown in FIGS. 13 and 14. The inner augmentor band 632 and the outer augmentor band 630 are both annular, and the outer augmentor band 630 is located radially outward of the inner augmentor band 632. The outer augmentor band 630 and the inner augmentor band 632 are radially spaced apart from one another to define a radial space 634 therebetween. In some embodiments, the outer augmentor band 630 and the inner augmentor band 632 are spaced apart radially from outer and inner walls of the bypass duct. In some embodiments, the outer augmentor band 630 and the inner augmentor band 632 are integrally formed with the outer and inner walls of the bypass duct, respectively.

The gas turbine engine 610 includes an outer flap 637 coupled with the outer augmentor band 630 and an inner flap 663 coupled with an inner augmentor band 632 as shown in FIGS. 13 and 14. Both flaps 637, 663 pivot relative to the respective augmentor band 630, 632 between a first position, as shown in FIG. 13, and a second position, as shown in FIG. 14.

The outer augmentor band 630 is formed to include a recess 643 extending radially outward and circumferentially around an axis of the gas turbine engine 610 as shown in FIGS. 13 and 14. The outer flap 637 is arranged in the recess 643. The outer flap 637 includes an axially forward end 639 and an axially aft end 641 opposite the axially forward end 639. The axially forward end 639 is pivotably coupled with the outer augmentor band 630. The axially aft end 641 moves radially relative to the outer augmentor band 630 in response to the outer flap 637 being pivoted.

The inner augmentor band 632 is formed to include a recess 667 extending radially inward and circumferentially around the axis of the gas turbine engine 610 as shown in FIGS. 13 and 14. The inner flap 663 is arranged in the recess 667. The inner flap 663 includes an axially forward end 671 and an axially aft end 673 opposite the axially forward end 671. The axially forward end 671 is pivotably coupled with the inner augmentor band 632. The axially aft end 673 moves radially relative to the inner augmentor band 632 in response to the inner flap 663 being pivoted.

The flaps 637, 663 are in the first position, as shown in FIG. 13, in response to the rotating detonation augmentor 626 being operated. In the first position, the axially aft end 641 of the outer flap 637 is pivoted radially inward toward the inner augmentor band 632, and the axially aft end 673 of the inner flap 663 is pivoted radially outward toward the outer augmentor band 630. In the first position, the axially aft ends 641, 673 of the flaps 637, 663 are pivoted toward one another such that the flaps 637, 663 converge radially toward one another. The flaps 637, 663 cooperate to form a throat 678 in the radial space 634 of the rotating detonation augmentor 626 to reduce a flow area of a first portion 615A of the bypass air flowing through the rotating detonation augmentor 626 while the rotating detonation augmentor 626 is operating. A second portion 615B of the bypass air flows around the rotating detonation augmentor 626 in the illustrative embodiment. A first gap G1 is formed between the axially aft end 641 of the outer flap 637 and the axially aft end 673 of the inner flap 663 while the flaps 637, 663 are in the first position.

The flaps 637, 663 are in the second position, as shown in FIG. 14, in response to the rotating detonation augmentor 626 not operating. In the second position, the axially aft end 641 of the outer flap 637 is pivoted radially outward so that a radially-inward facing surface of the outer flap 637 and a radially-inward facing surface of the outer augmentor band 630 are flush with one another to form a continuous surface. The axially aft end 673 of the inner flap 663 is pivoted radially inward toward the inner augmentor band 632 so that a radially-outward facing surface of the inner flap 663 and a radially-outward facing surface of the inner augmentor band 632 are flush with one another to form a continuous surface. In the second position, the axially aft ends 641, 673 of the flaps 637, 663 are pivoted away from one another so that the throat 678 in the radial space 634 of the rotating detonation augmentor 626 is removed while the rotating detonation augmentor 626 is not operating. Without the throat 678, the first portion 615A of the bypass air can freely flow through the rotating detonation augmentor 626. A second gap G2 greater than the first gap G1 is formed between the axially aft end 641 of the outer flap 637 and the axially aft end 673 of the inner flap 663 while the flaps 637, 663 are in the second position.

The outer flap 637 is formed to include outer fuel passages for a first flow of fuel to cool the outer augmentor band 630 and to reach the radial space 634. The outer fuel passages are fluidly coupled with a plurality of outlet holes 658 formed in the axially aft end 641 of the outer flap 637 as shown in FIG. 13. The plurality of outlet holes 658 direct the first flow of fuel out of the outer fuel passages formed in the outer flap 637 and into the radial space 634 for detonation therein. The plurality of outlet holes 658 are circumferentially spaced apart from one another on the axially aft end 641 of the outer flap 637. While the outer flap 637 is in the first position, as shown in FIG. 13, the plurality of outlet holes 658 are exposed to the radial space 634 so that the plurality of outlet holes 658 can direct the first flow of fuel into the radial space 634. While the outer flap 637 is in the second position, as shown in FIG. 14, the plurality of outlet holes 658 are not exposed to the radial space 634 because the outer flap 637 is pivoted radially outward into the recess 643.

The inner flap 663 is formed to include inner fuel passages for a second flow of fuel to cool the inner augmentor band 632 and to reach the radial space 634. The inner fuel passages are fluidly coupled with a plurality of outlet holes 676 formed in the axially aft end 673 of the inner flap 663 as shown in FIG. 13. The plurality of outlet holes 676 direct the second flow of fuel out of the inner fuel passages formed in the inner flap 663 and into the radial space 634 for detonation therein. The plurality of outlet holes 676 are circumferentially spaced apart from one another on the axially aft end 673 of the inner flap 663. While the inner flap 663 is in the first position, as shown in FIG. 13, the plurality of outlet holes 676 are exposed to the radial space 634 so that the plurality of outlet holes 676 can direct the second flow of fuel into the radial space 634. While the inner flap 663 is in the second position, as shown in FIG. 14, the plurality of outlet holes 676 are not exposed to the radial space 634 because the inner flap 663 is pivoted radially inward into the recess 667. While the flaps 637, 663 are in the first position, fuel injection occurs at the throat 678 due to the placement of the plurality of outlet holes 658, 676 on the axially aft ends 641, 673 of the flaps 637, 663.

In some embodiments, the rotating detonation augmentor 626 is coupled with an outer wall of the bypass duct by a strut for support of the rotating detonation augmentor 626 relative to the bypass duct. In this embodiment, the strut is formed to include a strut fuel passage fluidly connected with the outer fuel passages formed in the outer flap 637 and the inner fuel passages formed in the inner flap 663. In some embodiments, the strut may be further formed to include an air passage extending therethrough for the passage of pressurized air. Radially injecting pressurized air into the radial space 634 downstream of the fuel injection at the throat 678 promotes rapid mixing of the fuel and the first portion 615A of the bypass air and thus, total energy increase of the fuel and the first portion 615A of the bypass air prior to detonation. The mixing of the fuel and the first portion 615A of the bypass air in the radial space 634 may create recirculation zones, which further promote mixing.

The gas turbine engine 610 further includes an actuator 692 to pivot the flaps 637, 663 between the first position and the second position and a controller 694 configured to selectively control the actuator 692, the fuel flow, and the pressurized air flow as shown in FIGS. 13 and 14. In response to receiving a first command signal indicative of operation of the rotating detonation augmentor 626 from the controller 694, the actuator 692 pivots the flaps 637, 663 to assume the first position as shown in FIG. 13. At this time, fuel injection and pressurized air injection may also occur into the radial space 634. In response to receiving a second command signal indicative of stopping operation of the rotating detonation augmentor 626 from the controller 694, the actuator 692 pivots the flaps 637, 663 to assume the second position as shown in FIG. 14. At the time, fuel injection and pressurized air injection into the radial space 634 may also stop.

A method for directing bypass air through the bypass duct 24, 224, 324, 424, 524 is provided. The method includes directing a flow of air between the first wall 19, 219, 319 and the second wall 23, 223, 323 of the bypass duct 24, 224, 324 that is arranged along the axis 11. The method includes detonating fuel 28 and the first portion 15A, 215A, 315A, of the bypass air with the rotating detonation augmentor 26, 226, 326 that includes the first augmentor band 30, 230, 330 that extends circumferentially around the axis 11. The method includes moving the flow valve 36, 236, 336 relative to the first wall 19, 219, 319 of the bypass duct 24, 224, 324 from a first position in which a gap between the flow valve 36, 236, 336 and the first augmentor band 30, 230, 330 has the first dimension S1, D1 to a second position in which the gap between the flow valve 36, 236, 336 and the first augmentor band 30, 230, 330 has the second dimension S2, D2 that is greater than the first dimension S1, D1.

In some embodiments, moving the flow valve 36, 236 includes translating the flow valve 36, 236 axially relative to the first wall 19, 219 of the bypass duct 24, 224, 324. In some embodiments, moving the flow valve 336 includes pivoting the first end 339 of the flow valve 336 relative to the first wall 319 of the bypass duct 324 to cause the second end 341 of the flow valve 336 to move toward the first augmentor band 330.

A method of detonating fuel 28 is provided. The method includes directing fuel 28 radially into the fuel passage 84 of the strut located in the bypass duct 24, 224, 324, 424, 524 included in the gas turbine engine 10, 210, 310, 410, 510, 610. The method includes conducting the fuel 28 axially aft through the first augmentor band 30, 230, 330, 430, 530, 630 of the rotating detonation augmentor 26, 226, 326, 426, 526, 626 located in the bypass duct 24, 224, 324, 424, 524. The first augmentor band 30, 230, 330, 430, 530, 630 is coupled with the strut. The first augmentor band 30, 230, 330, 430, 530, 630 extends circumferentially relative to the axis 11. The method includes directing the fuel 28 radially and then axially forward through the first augmentor band 30, 230, 330, 430, 530, 630 along the first wall of the first augmentor band 30, 230, 330, 430, 530, 630 to cool the first wall. The method includes discharging the fuel 28 radially into the bypass duct 24, 224, 324, 424, 524 via outlets formed in the first augmentor band 30, 230, 330, 430, 530, 630. The method includes detonating the fuel 28 downstream of the outlets 58, 658.

The step of conducting the fuel 28 axially aft through the first augmentor band 30, 230, 330, 430, 530, 630 of the rotating detonation augmentor 26, 226, 326, 426, 526, 626 located in the bypass duct 24, 224, 324, 424, 524 includes conducting the fuel 28 axially aft through the first hollow space defined radially between the first wall and the second wall spaced radially apart from the first wall and then conducting the fuel 28 axially aft through the second hollow space defined radially between the second wall and the intermediate wall located radially between the first wall and the second wall. The rotating detonation augmentor 26, 226, 326, 426, 526, 626 further includes the second augmentor band 32, 232, 332, 432, 532, 632 spaced apart radially from the first augmentor band 30, 230, 330, 430, 530, 630 to define the throat therebetween.

A method of restricting flow area of air is provided. The method includes directing the flow of air between the first wall and the second wall of the bypass duct 24, 224, 324, 424, 524 that is arranged along the axis 11. The method includes restricting the flow area of the first portion 15A, 215A, 315A, 415A, 515A, 615A of the flow of the air passing between the first augmentor band 30, 230, 330, 430, 530, 630 and the second augmentor band 32, 232, 332, 432, 532, 632 of the rotating detonation augmentor 26, 226, 326, 426, 526, 626 located within the bypass duct 24, 224, 324, 424, 524. The method includes detonating fuel 28 and the first portion 15A, 215A, 315A, 415A, 515A, 615A of the flow of the air with the rotating detonation augmentor 26, 226, 326, 426, 526, 626. The method includes unrestricting the flow area of the first portion 15A, 215A, 315A, 415A, 515A, 615A of the flow of the air passing between the first augmentor band 30, 230, 330, 430, 530, 630 and the second augmentor band 32, 232, 332, 432, 532, 632 of the rotating detonation augmentor 26, 226, 326, 426, 526, 626 to minimize pressure loss of the first portion 15A, 215A, 315A, 415A, 515A, 615A of the flow of the air. Unrestricting the flow area of the first portion 15A, 215A, 315A, 415A, 515A, 615A of the flow of the air includes increasing or causing the flow area to be greater in size than the flow area when the first portion 15A, 215A, 315A, 415A, 515A, 615A of the flow of the air is restricted. In other words, unrestricting the flow area includes any increase in the flow rate or flow volume of air. In some embodiments, the restricting step chokes the flow and the unrestricted step unchokes the flow. In some embodiments, the restricting step reduces flow without choking the flow.

In some embodiments, the step of restricting the flow area of the first portion 415A of the flow of the air includes aligning axially the throat body 435 of the throat-control band 433 with the first augmentor band 430 and the second augmentor band 432 In some embodiments, the step of unrestricting the flow area of the first portion 415A of the flow of the air includes moving the throat body 435 of the throat-control band 433 axially relative to the axis 11 to cause the throat body 435 to be at least partially axially misaligned with the first augmentor band 430 and the second augmentor band 432.

In some embodiments, the step of restricting the flow area of the first portion 515A of the flow of the air includes directing a flow of pressurized air 588 radially between the first augmentor band 530 and the second augmenter band 532. The flow of the pressurized air 588 has a pressure that is greater than a pressure of the first portion 515A of the flow of the air. In some embodiments, the step of unrestricting the flow area of the first portion 515A of the flow of the air includes stopping the flow of the pressurized air 588 radially between the first augmentor band 530 and the second augmenter band 532.

In some embodiments, the step of restricting the flow area of the first portion 615A of the flow of the air includes moving the first flap 637 coupled with the first augmentor band 630 and the second flap 663 coupled with the second augmentor band 632 to cause the first portion 641 of the first flap 637 to be spaced apart from the second portion 673 of the second flap 663 by a first radial distance G1. In some embodiments, the step of unrestricting the flow area of the first portion 615A of the flow of the air includes moving the first flap 637 and the second flap 663 such that the first portion 641 of the first flap 637 is spaced apart from the second portion 673 of the second flap 663 by the second radial distance G2 that is greater than the first radial distance G1.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising:
   a bypass duct configured to conduct air through a flow path arranged around an engine core of the gas turbine engine to provide thrust for propelling the gas turbine engine, the bypass duct having an outer wall arranged circumferentially about an axis to define an outer boundary of the flow path and an inner wall arranged circumferentially about the axis to define an inner boundary of the flow path, and
   a rotating detonation augmentor located in the bypass duct and configured to be selectively operated to detonate fuel and a portion of the air to increase the thrust for propelling the gas turbine engine, the rotating detonation augmentor including an inner augmentor band that extends circumferentially about the axis, an outer augmentor band that extends circumferentially around the inner augmentor band, and flow restriction means for selectively producing a throat located radially between the inner augmentor band and the outer augmentor band that contracts a flow area of the portion of the air flowing through the rotating detonation augmentor and blocks detonated gases from flowing upstream through the throat when the rotating detonation augmentor is being operated and for removing the throat to allow the portion of the air to flow freely between the inner augmentor band and the outer augmentor band to minimize pressure losses in the bypass duct when the rotating detonation augmentor is not being operated.

2. The gas turbine engine of claim 1, wherein the flow restriction means includes a throat-control band located radially between the outer augmentor band and the inner augmentor band, the throat-control band having a ring segment that extends circumferentially relative to the axis and a throat body that extends radially away from the ring segment, and the throat-control band is configured to move axially between a first position in which the throat body is aligned axially with the outer augmentor band and the inner augmentor band to produce the throat and a second position in which the throat body is axially misaligned with the outer augmentor band and the inner augmentor band so that the portion of air is not restricted in the rotating detonation augmentor.

3. The gas turbine engine of claim 2, wherein the throat body includes a first protrusion that extends radially outward away from the ring segment toward the outer augmentor band and a second protrusion that extends radially inward from the ring segment toward the inner augmentor band.

4. The gas turbine engine of claim 1, wherein the flow restriction means includes a source of high pressure air that directs selectively pressurized air, having a pressure greater than a pressure of the air flowing through the bypass duct, into a space radially between the outer augmentor band and the inner augmentor band to provide the throat.

5. The gas turbine engine of claim 4, wherein the flow restriction means further includes first passages formed in the outer augmentor band that are in fluid communication with the source of high pressure air and open into the space and second passages formed in the inner augmentor band that are in fluid communication with the source of high pressure air and open into the space.

6. The gas turbine engine of claim 1, wherein the flow restriction means includes an outer flap coupled with the outer augmentor band and an inner flap coupled with the inner augmentor band, wherein the outer flap and the inner flap are configured to move between a first arrangement in which the outer flap and the inner flap converge radially toward one another as the outer flap and the inner flap extend axially aft to provide the throat and a second arrangement in which the outer flap and the inner flap are moved radially outward away from the first arrangement so that the portion of air is not restricted in the rotating detonation augmentor.

7. The gas turbine engine of claim 6, wherein the outer flap is formed to include outer fuel passages that extend through the outer flap and open into a space defined radially between the outer augmentor band and the inner augmentor band to direct selectively a first fuel flow into the space and wherein the inner flap is formed to include inner fuel passages that extend through the inner flap and open into the space to direct selectively a second fuel flow into the space.

8. The gas turbine engine of claim 7, wherein, in the second arrangement, a radial inner surface of the outer flap is generally flush with a radial inner surface of the outer augmentor band and a radial outer surface of the inner flap is generally flush with a radial outer surface of the inner augmentor band.

9. The gas turbine engine of claim 1, wherein the rotating detonation augmentor further includes a strut and an ejector ring, wherein the strut extends from one of the outer wall and the inner wall radially into the flow path and is coupled with the outer augmentor band and the inner augmentor band, and wherein the ejector ring extends circumferentially about the axis, is coupled with the strut, and is configured to direct pressurized air into the rotating detonation augmentor.

10. A gas turbine engine comprising:
a bypass duct having an outer wall arranged circumferentially about an axis to define an outer boundary of a flow path and an inner wall arranged circumferentially about the axis to define an inner boundary of the flow path, and
a rotating detonation augmentor located in the bypass duct and including a first augmentor band that extends circumferentially about the axis, a second augmentor band that extends circumferentially about the axis and is aligned axially with the first augmentor band, and a flow restrictor configured to selectively produce a throat radially between the first augmentor band and the second augmentor band to block gases from flowing upstream through the throat when the rotating detonation augmentor is being operated.

11. The gas turbine engine of claim 10, wherein the first augmentor band is integrally formed with one of the outer wall and the inner wall of the bypass duct.

12. The gas turbine engine of claim 10, wherein the flow restrictor includes a throat-control band located radially between the first augmentor band and the second augmentor band, the throat-control band having a ring segment that extends circumferentially relative to the axis and a throat body that extends radially away from the ring segment, and the throat-control band is configured to move axially between a first position in which the throat body is aligned axially with the first augmentor band and the second augmentor band to produce the throat and a second position in which the throat body is at least partway misaligned axially with the first augmentor band and the second augmentor band.

13. The gas turbine engine of claim 10, wherein the flow restrictor includes a source of high pressure air that directs selectively pressurized air, having a pressure greater than a pressure of air flowing through the bypass duct, into a space radially between the first augmentor band and the second augmentor band to provide the throat.

14. The gas turbine engine of claim 13, wherein the flow restrictor further includes first passages formed in the first augmentor band that are in fluid communication with the source of high pressure air and open into the space and second passages formed in the second augmentor band that are in fluid communication with the source of high pressure air and open into the space.

15. The gas turbine engine of claim 10, wherein the flow restrictor includes a first flap coupled with the first augmentor band and a second flap coupled with the second augmentor band, wherein the first flap is configured to pivot relative to the first augmentor band and the second flap is configured to pivot relative to the second augmentor band.

16. The gas turbine engine of claim 15, wherein the first flap is formed to include first fuel passages that extend through the first flap and open into a space defined radially between the first augmentor band and the second augmentor band to direct selectively a first fuel flow into the space and wherein the second flap is formed to include second fuel passages that extend through the second flap and open into the space to direct selectively a second fuel flow into the space.

17. A method comprising:
directing a flow of air between a first wall and a second wall of a bypass duct that is arranged along an axis,
restricting a flow area of a portion of the flow of the air passing between a first augmentor band and a second augmentor band of a rotating detonation augmentor located within the bypass duct,
detonating fuel and the portion of the flow of the air with the rotating detonation augmentor, and
unrestricting the flow area of the portion of the flow of the air passing between the first augmentor band and the second augmentor band of the rotating detonation augmentor to minimize pressure loss of the portion of the flow of the air.

18. The method of claim 17, wherein restricting the flow area of the portion of the flow of the air includes aligning axially a throat body of a throat-control band with the first augmentor band and the second augmentor band, and wherein unrestricting the flow area of the portion of the flow of the air includes moving the throat body of the throat-control band axially relative to the axis to cause the throat body to be at least partially axially misaligned with the first augmentor band and the second augmentor band.

19. The method of claim 17, wherein restricting the flow area of the portion of the flow of the air includes directing a flow of pressurized air radially between the first augmentor band and the second augmenter band, the flow of the pressurized air having a pressure that is greater than a pressure of the portion of the flow of the air, and wherein unrestricting the flow area of the portion of the flow of the air includes stopping the flow of the pressurized air radially between the first augmentor band and the second augmenter band.

20. The method of claim 17, wherein restricting the flow area of the portion of the flow of the air includes moving a first flap coupled with the first augmentor band and a second flap coupled with the second augmentor band to cause a first portion of the first flap to be spaced apart from a second portion of the second flap by a first radial distance, and wherein unrestricting the flow area of the portion of the flow of the air includes moving the first flap and the second flap such that the first portion of the first flap is spaced apart from the second portion of the second flap by a second radial distance that is greater than the first radial distance.

* * * * *